(12) United States Patent
Okada et al.

(10) Patent No.: US 8,011,268 B2
(45) Date of Patent: Sep. 6, 2011

(54) STEERING COLUMN SYSTEM

(75) Inventors: Shinji Okada, Fujisawa (JP); Hiroshi Shibazaki, Fujisawa (JP); Toshimasa Wada, Fujisawa (JP)

(73) Assignee: NSK Ltd., Tokyo (JP)

( * ) Notice: Subject to any disclaimer, the term of this patent is extended or adjusted under 35 U.S.C. 154(b) by 634 days.

(21) Appl. No.: 12/094,464

(22) PCT Filed: Nov. 21, 2006

(86) PCT No.: PCT/JP2006/323237
§ 371 (c)(1),
(2), (4) Date: May 21, 2008

(87) PCT Pub. No.: WO2007/058362
PCT Pub. Date: May 24, 2007

(65) Prior Publication Data
US 2009/0272219 A1   Nov. 5, 2009

(30) Foreign Application Priority Data

Nov. 21, 2005 (JP) .............................. P. 2005-335441
Nov. 7, 2006 (JP) .............................. P. 2006-301488
Nov. 20, 2006 (JP) ................................ 2006-312432

(51) Int. Cl.
*B62D 1/18* (2006.01)
(52) U.S. Cl. .......................................... 74/493; 280/775
(58) Field of Classification Search .................... 74/492, 74/493; 280/775
See application file for complete search history.

(56) References Cited

U.S. PATENT DOCUMENTS

| | | | |
|---|---|---|---|
| 5,743,150 A * | 4/1998 | Fevre et al. | 74/493 |
| 6,390,717 B1 | 5/2002 | Bär | |
| 7,752,940 B2 * | 7/2010 | Lutz | 74/493 |
| 2005/0016315 A1 * | 1/2005 | Breuss et al. | 74/493 |
| 2005/0087129 A1 * | 4/2005 | Kitano et al. | 118/666 |
| 2009/0044656 A1 * | 2/2009 | Okada et al. | 74/493 |
| 2009/0199673 A1 * | 8/2009 | Tinnin | 74/493 |

FOREIGN PATENT DOCUMENTS

| | | |
|---|---|---|
| EP | 0 796 780 A2 | 3/1997 |
| EP | 1 394 012 A1 | 6/2003 |
| JP | 7-117686 A | 5/1995 |
| JP | 9-221043 A | 8/1997 |
| JP | 9-254792 A | 9/1997 |
| JP | 10-35511 A | 2/1998 |
| JP | 2002-96743 A | 4/2002 |
| WO | WO 2006120968 A1 * | 11/2006 |

* cited by examiner

*Primary Examiner* — Justin Krause
(74) *Attorney, Agent, or Firm* — Sughrue Mion, PLLC

(57) ABSTRACT

To provide a steering column system which has superior operating feeling and operating properties which can suppress an operational failure, an engaging arm is displaced relative to a cam member by an annular member that is deformed elastically. Distal ends of gear teeth are made to shift from each other, making it possible not only to enhance the feeling of the operation lever, but also to facilitate meshing of the gear teeth.

7 Claims, 24 Drawing Sheets

(a)

(c)

(b)

(d)

(a)

(b)

(a)

(b)

(a)

(b)

STEERING COLUMN SYSTEM

TECHNICAL FIELD

The present invention relates to a steering column system which supports a steering shaft in such a way that the position thereof can be adjusted.

BACKGROUND ART

A steering column system constitutes a critical safety securing component of a vehicle, and it is very important how to control the behavior thereof at the time of a crash in order to secure the safety of an occupant when he or she is involved in the crash. Normally, an impact energy absorbing mechanism is provided in a steering column system itself, and the steering column system plays an important role as a supporting member of an air bag that is encased within a steering wheel.

On the other hand, in order for drivers to have their optimum driving postures, general steering column systems are constructed such that the tilt angle of the steering wheel can be adjusted and the axial position of the steering wheel can be adjusted according to the builds and driving postures of the drivers. Consequently, the steering column systems are required to have contradicting functions to facilitate the adjustment of the position and posture of the column main body (that is, the steering wheel) and to secure predetermined position and posture at the time of a crash. In conventional steering column systems, various devices have been made to make these contradicting functions compatible, however, in association with the users' demands for operability increasing, further improvements are required.

Here, in Patent Document No. 1, a steering column system is disclosed in which a column main body can be held by superimposing a multiplicity of friction plates one on another and making use of frictional force generated therebetween.

Patent Document No. 1: Japanese Patent Unexamined Publication JP-A-10-35511

Patent Document No. 2; Japanese Patent Unexamined Publication JP-A-9-221043

Patent Document No. 3: European Patent Examined Publication EP-1394012-B1

Patent Document No. 4: European Patent Examined Publication EP-796780-B1

Patent Document No. 5: U.S. patent Examined Publication U.S. Pat. No. 6,390,717

DISCLOSURE OF THE INVENTION

Problem that the Invention is to Solve

In the mechanism in which the multiplicity of friction plates are superimposed, however, there are problems that the configuration becomes complex and that vibrations produced when the multiplicity of fiction plates rub against each other during a tilt/telescoping adjustment are easily transmitted to the operator to deteriorate the operation feeling. In addition, due to an increase in the number of components, there is caused a problem that the number of assembling man-hours is increased.

On the other hand, in Patent Document No. 2, a steering column system is disclosed in which a gear is provided on a lever which can rotate about a shaft which engages with an elongated hole in a bracket mounted on a body, and this gear is made to mesh with a gear provided on a column so as to fix the column in such a manner that the position thereof can be adjusted in a tilting direction. However, according to this related art, since the gears are spur gears and come to mesh with each other from the front, there is a fear that a meshing failure occurs in which distal ends of the gears come into abutment with each other. In addition, the thickness of gear teeth needs to be increased when estimating a case where large impact is exerted on the gears at the time of a secondary crash, and this causes a problem that an enlarged configuration is called for. In particular, in at configuration shown in FIG. 3 of Patent Document No. 1, since the configuration is such that a movable gear and a tilt lever are coupled together by a support pin, a countermeasure becomes necessary in which the thickness of the support pin is increased in order to increase the strength of the pin.

Furthermore, although techniques are disclosed in Patent Documents Nos. 3, 4, in which when making gears mesh with each other from the front, meshing guide pins are made to mesh with each other in advance or meshing of the gears is guided using a guide so as to suppress the meshing failure, these techniques are insufficient to eliminate the meshing failure completely and cause a problem that a relatively large space is necessary.

In addition, in Patent Document No. 5, a technique is disclosed in which magnetic properties are given individually to gears which mesh with each other to thereby suppress the abutment of distal ends of the gears. However, magnetic force is insufficient to avoid completely the abutment of the distal ends of the gears. In addition, there is a problem that the formation of gears having magnetic properties is very difficult.

In contrast to these conventional techniques, the applicant proposes in Patent Application No. 2005-134974 a steering column system for supporting a steering shaft in such a manner that the position thereof can be adjust at least one of a tilting direction and a telescoping direction, having a primary gear which is positioned relative to a body, a column main body which supports rotatably the steering shaft and a secondary gear which is displaced together with the column main body, wherein the column main body is made to be positioned relative to the body by causing the primary gear and the secondary gear to mesh with each other (this being referred to as a gear meshing function) and the column main body is made to be adjusted in position relative to the body by releasing the gears from meshing. By this configuration, the deterioration in operation feeling which occurred when using the multiplicity of friction plates can be avoided, and furthermore, a large holding force can be exhibited after the primary gear and the secondary gear have meshed with each other.

In this type of steering column system, however, when distal ends of the primary gear and distal ends of the secondary gear are brought into abutment with each other, there is caused a fear that a meshing failure is generated. Then, in the patent application in question, the primary gear and the secondary gear are made to approach each other for meshing in any other directions than a normal direction and a tangent direction relative to a tooth trace of each of the gears so as to avoid the meshing failure. However, it is still difficult to avoid completely the meshing failure with this configuration.

The invention has been made in view of the problems inherent in the conventional techniques, and an object thereof is to provide a steering column system which has superior operation feeling and operability and can suppress the operation failure.

Means for Solving the Problem

According to a first invention, there is provided a steering column system in which a column is fixed relative to a body by a gear meshing function by a steering position adjusting operation lever, wherein the operation lever includes an engaging arm which includes gear teeth which provide the gear meshing function and an adjusting arm on which a position adjusting bolt is assembled and which performs a position adjusting operation, and in that by passing the position adjusting bolt through an oscillation center hole provided in the engaging arm, at least the engaging arm is supported in such a manner as to be displaced within a predetermined rage relative to the column.

The engaging arm and the adjusting arm are preferably permitted to perform a predetermined relative movement to each other.

An elastic element is preferably disposed between the position adjusting bolt which is passed through the oscillation center hole provided in the engaging arm and the oscillation center hole.

When a collar is positioned on the position adjusting bolt or between the position adjusting bolt and the oscillation center hole, a recessed portion or a raised portion is preferably formed on at least one of the collar and the oscillation center hole so that the elastic element is positioned therein or thereon.

An elastic element is preferably disposed between a projection which is provided on one of the engaging arm and the adjusting arm and a receiving portion which is provided on the other.

An engaging means is preferably provided for controlling a relative rotational amount between the engaging arm and the adjusting arm to a predetermined amount.

The engaging arm and the adjusting arm are preferably made to rotate together.

According to a second invention, there is provided a steering column system for fixing a column to a body by operating a steering position adjusting operation lever, characterized by having a gear portion which includes primary gear teeth which are driven in response to operation of the operation lever and second gear teeth which mesh with the primary gear teeth so driven, so that the column is fixed to the body through meshing of the primary gear teeth with the secondary gear teeth, the gear portion being supported in such a manner as to be displaced within a predetermined range relative to the column.

Where the gear member is held via an elastic element relative to the column, the gear member is preferably biased to a predetermined initial position when the gear teeth are not in mesh with each other. The elastic element includes a rubber and a spring.

The gear portion can preferably be displaced in a direction in which the position of the column is adjusted.

The gear teeth are preferably formed on both facing tapered surfaces.

When the direction of a tooth trace of the gear is formed on a tangent to a circular arc R which passes through a tooth flank about the position adjusting bolt as a center axis or the direction of a tooth trace of the gear is formed, on an imaginary plane which would be drawn by a tangent L to a circular arc R which passes through a gear tooth flank about the position adjusting bolt as a center axis and an axis which is in parallel with an axial direction of the position adjusting bolt and which passes through the gear tooth flank on an inclined surface inclined at an angle α from the tangent L, the gear teeth preferably have a space G between tooth flanks of the confronting gears in mesh in an axial direction which passes through the center axis of the position adjusting bolt and which is normal to the tooth traces when the gear teeth mesh with each other, and the space G preferably has a space G which is a least or more space in which the gear teeth having a straight-line tooth trace can be displaced along a locus of the circular arc about the position adjusting bolt for meshing with each other.

Advantage of the Invention

According to the first invention, since the operation lever includes the engaging arm which includes the gear teeth which provide the gear meshing function and the adjusting arm on which the position adjusting bolt is assembled and which performs the position adjusting operation and by passing the position adjusting bolt through the oscillation center hole provided in the engaging arm, at least the engaging arm is supported in such a manner as to be displaced within the predetermined rage relative to the column, in the event that distal ends of the gear teeth are brought into abutment with each other, the meshing failure is made to be avoided by displacing the engaging arm. Here, "within the predetermined rage" means a range within one pitch of the gear teeth.

According to the second invention, since the steering column system has the gear portion which includes the primary gear teeth which are driven according to operation of the operation lever and the second gear teeth which mesh with the primary gear teeth so driven, so that the column is fixed to the body through meshing of the primary gear teeth with the secondary gear teeth and the gear portion is supported in such a manner as to be displaced within the predetermined range relative to the column, in the event that distal ends of the primary gear teeth and the secondary gear teeth are brought into abutment with each other, the meshing failure is made to be avoided by displacing the gear portion.

BRIEF DESCRIPTION OF THE DRAWINGS

FIG. 3 FIG. 3(a) is a diagram showing a state in which gears 17, 19a are in abutment with each other, and FIG. 3(b) is a diagram showing a portion indicated by an arrow IIIB in FIG. 3(a) in an enlarged fashion. FIG. 3(c) is a diagram showing a state in which gears 18, 20a are in abutment with each other, and FIG. 3(d) is a diagram showing a portion indicated by an arrow IIID in FIG. 3(c) in an enlarged fashion.

FIG. 5 FIG. 5(a) is a perspective view of an engaging arm 105 and a cam member 112 according to a second embodiment, and FIG. 5(b) is an exploded side view of an engaging arm 105 of a modified example.

FIG. 8 FIG. 8(a) is a side view of an engaging arm 405 according to a fifth embodiment, and FIG. 8(b) is a side view of a lever according to the fifth embodiment.

FIG. 9 FIG. 9(a) is a side view of an engaging arm 505 according to a sixth embodiment, and FIG. 9(b) is a side view of a lever 507 according to the sixth embodiment.

Figure 1:
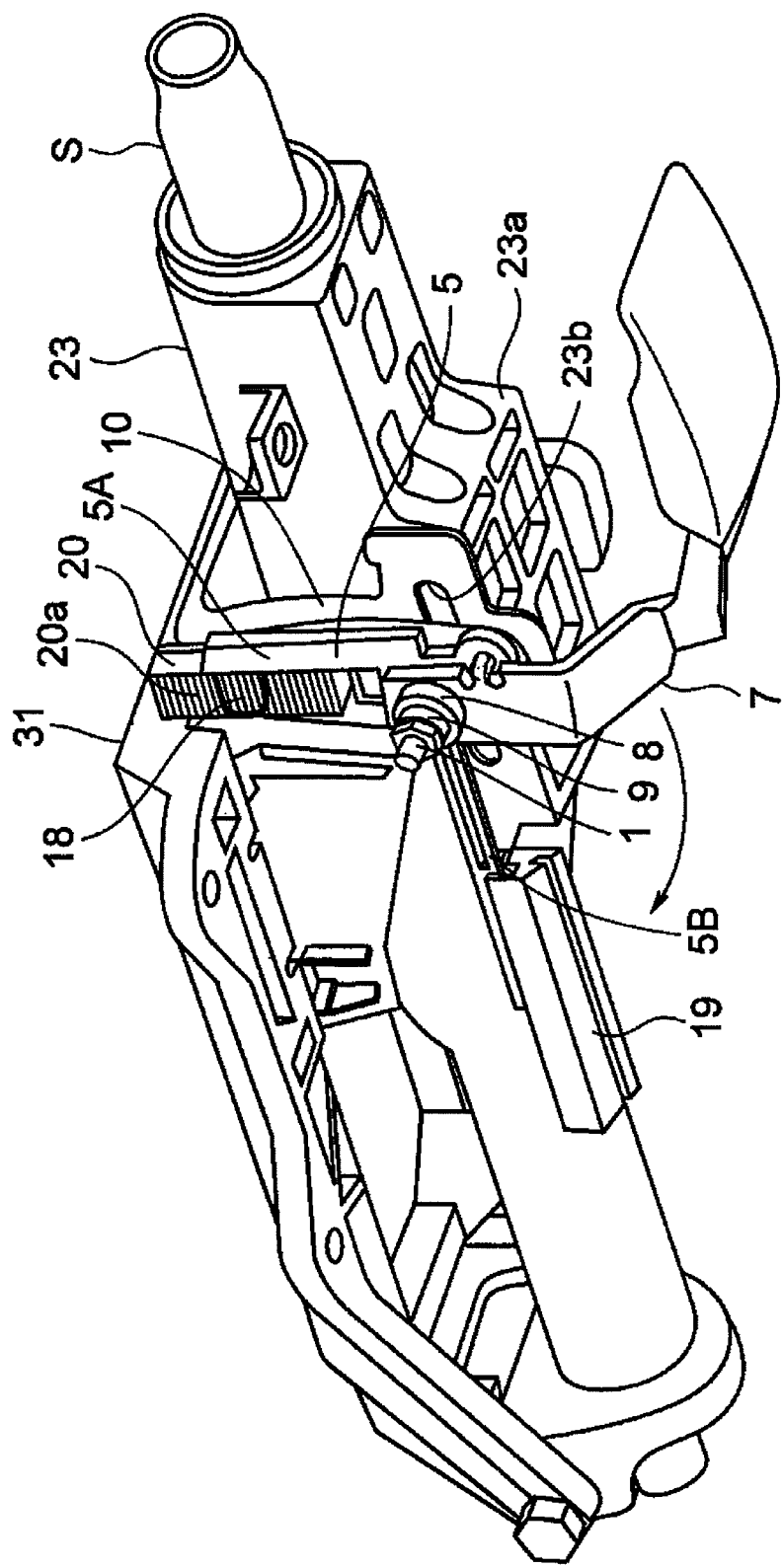
FIG. 1 A perspective view of a steering column system according to an embodiment of the invention, which shows an assembled state.

DESCRIPTION OF REFERENCE NUMERALS AND CHARACTERS 1 clamp bolt; 2 washer; 3 cam plate; 5 engaging arm; 5A primary straight-line portion; 5B secondary straight-line portion; 6, 6' elastic element; 7 lever; 8 thrust bearing; 9 nut; 11 hook portion; 13 rectangular opening; 15' small opening; 15A rectangular opening; 15B rectangular opening; 15a groove; 16 circular cylindrical portion; 168 angular cylindrical portion; 17 gear tooth; 18 gear tooth; 19 telescoping gear portion; 19a gear tooth; 20 tilting gear portion; 20a gear tooth; 21 hexagonal opening; 22 cam member; 23 column main body; 23a box; 23b telescoping hole; 24 annular member; 25 washer; 26 cam portion; 31 stationary bracket; 32 movable bracket; 32a tilting hole; 105 engaging arm; 105A primary straight-line member; 105E secondary straight-line member, 112 cam member; 124, 124 elastic element; 205 engaging arm; 205A primary straight-line portion; 205B secondary straight-line portion; 207 lever; 211 hook portion; 211A hook portion; 211A to 211C hook portion; 215A to 215C small opening; 305 engaging arm; 305 straight-line portion; 305A primary straight-line portion; 305B secondary straight-line portion; 307 lever; 311A hook portion; 311B hook portion; 315 engaging portion; 405 engaging arm; 407 lever; 411A hook portion; 415A small opening; 505 engaging arm; 505A primary straight-line portion; 505B secondary straight-line portion; 507 lever; 511A hook portion; 511B hook portion; 511C hook portion; 515 stepped portion; 605 engaging arm; 607 lever; 701 shaft; 701a external serration; 701b head portion; 701c engaging portion; 701d external thread portion; 701e recessed portion; 705 engaging arm; 705a tooth; 705b small opening; 705c operation lever; 707a internal serration; 707b opening; 707c projection; 720 tilt position fixing gear portion; 720a opening; 720b tooth; 720c raised portion; 720d elongated hole; 723 column main body; 723a elongated hole; 724 elastic element; 724a thin belt portion; 731 stationary bracket; 731a side plate; 810 telescoping gear portion; 819 telescoping gear portion; 819a gear tooth; 820 tilting gear portion; 820a gear tooth; 919 telescoping gear portion; 919a gear tooth; 919b through hole; 1018 drive gear portion; 1018a side surface portion; 1018b front surface portion; 1018c opening; 1018d gear tooth; 1020 tilting gear portion; 1020a gear tooth; 1020b opening; CP fastening tool; RB rubber member; S steering shaft; SPG coil spring; BRG bearing; E elastic element; H1 height; S steering shaft.

BEST MODE FOR CARRYING OUT THE INVENTION

Figure 2:
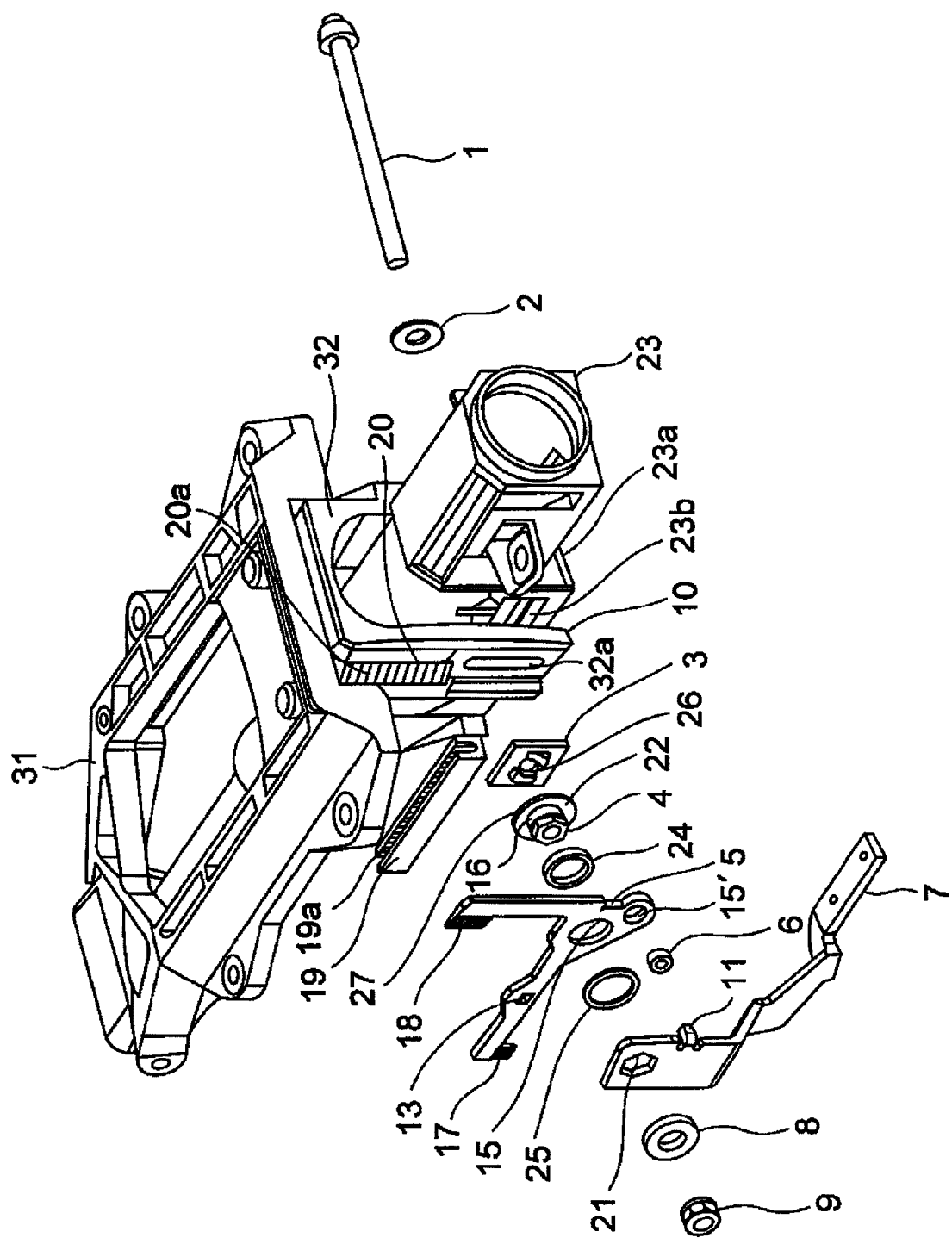
FIG. 2 A perspective view of the steering column system according to the embodiment of the invention, which shows a disassembled state.

Hereinafter, tilting/telescoping steering systems according to embodiments of the invention will be described by reference to the drawings. FIGS. 1, 2 are perspective views of a steering column system according to an embodiment, of which FIG. 1 shows an assembled state and FIG. 2 shows a disassembled state. In this description, a "telescoping direction" means an axial direction of a steering shaft, and a "tilting direction" means a direction which intersects the telescoping direction (in particular, a vertical direction).

A movable bracket 32 having an inverted U-shape cross section is mounted underneath a stationary bracket 31 mounted on a body, not shown. While the movable bracket 32 is normally fixed to the stationary bracket 31, when it is subject to an impact, the movable bracket 32 is designed to be displaced in the telescoping direction.

A cylindrical column main body (also, referred to simply as a column) 23 is mounted in such a manner as to be accommodated in the movable bracket 32. A steering shaft S (FIG. 1), which couples a steering wheel, not shown, to a steering mechanism, is passed into the column main body 23 and is rotatably supported by bearings, not shown. A telescoping gear portion 19 is mounted on a side of the column main body 23. The telescoping gear portion 19 is made up of a plate material which is bent to have a U-shape cross section and parallel gear teeth 19a are formed on both inner side surfaces of the plate material.

Elongated hole-like telescoping holes 23b are formed in a box 23a, which is formed underneath the column main body 23, in such a manner as to extend in the telescoping direction. In addition, elongated hole-like tilting holes 32a are formed in sides of the movable bracket 32 in such a manner as to extend in the tilting direction and a tilting gear portion 20 is formed on one of the sides of the movable bracket 32. Parallel gear teeth 20a are formed on a surface of the tilting gear portion 20. In addition, the tilting gear portion 20 may be made up of a plate material which is bent into a U-shape as with the telescoping gear portion 19.

A rotatable clamp bolt (a position adjusting bolt) 1, which passes through the tilting holes 32a provided in the movable bracket 32 and the telescoping holes 23b provided in the column main body 23 via a washer 2 from the right as seen in FIG. 2, passes through a cam plate 3, a cam member (a member which corresponds to the clamp bolt) 22, an annular member 24 formed of an elastic member such as a rubber, an engaging arm 5, a washer 25 formed of a resin such as PTFE, a lever (an adjusting arm) 7 and a thrust bearing 8 and is thread fastened by a nut 9. The engaging arm 5 and the lever 7 are assembled together in such a manner as to overlap each other along an axis of the clamp bolt 1 which constitutes an oscillation axis.

Figure 4:
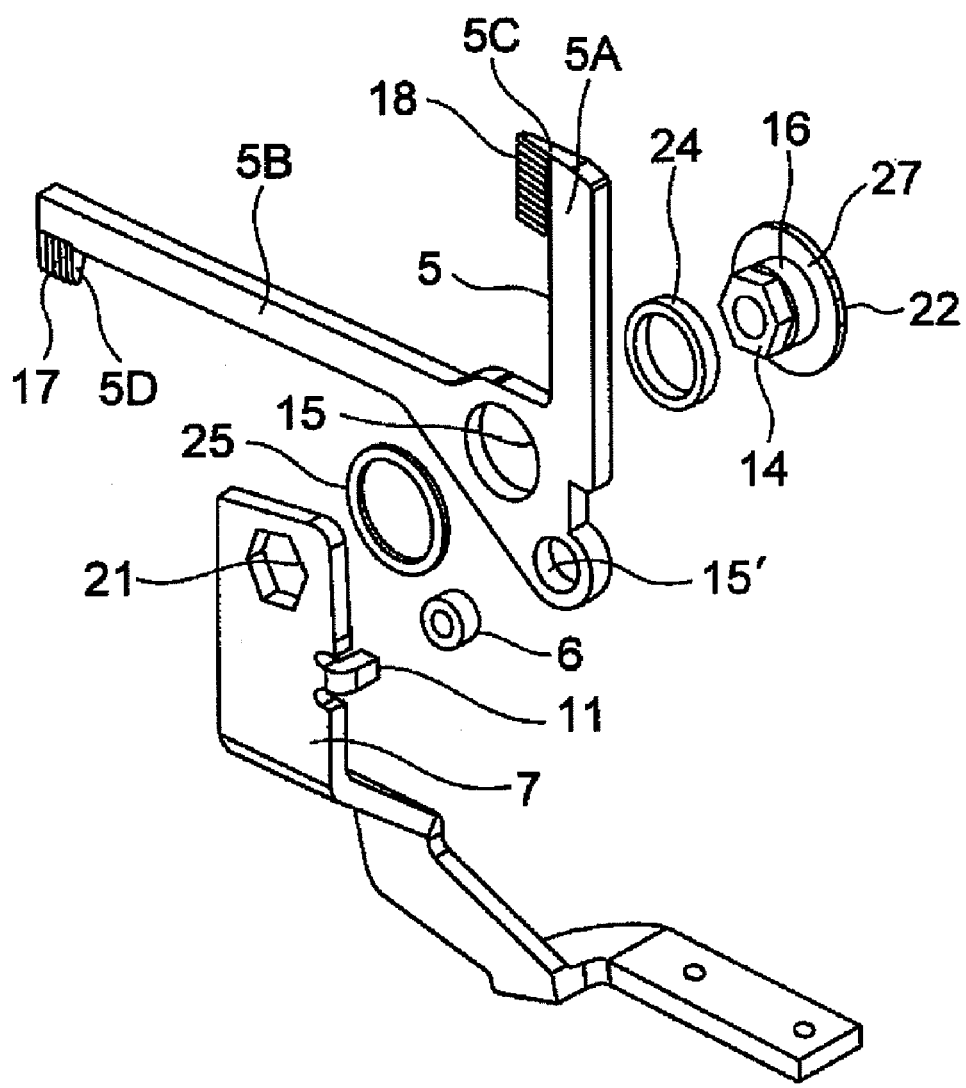
FIG. 4 An enlarged view of the periphery of an engaging arm 5 and a lever 7.

FIG. 4 is an enlarged view of the periphery of the engaging arm 5 and the lever 7. In FIG. 4, the hollow cam member 22 has a configuration in which a thin plate 27, a circular cylindrical portion 16 and a hexagonal portion 14 are connected coaxially together.

The engaging arm 5 is made up of a substantially L-shaped plate material in which a primary straight-line portion 5A and a secondary straight-line portion 5B are connected together in such a manner as to intersect at right angles, and parallel and tapered gear teeth 18, which are directed slightly further upwards than a horizontal direction, are formed on both side surfaces of a plate portion 5C, which projects horizontally and which is tapered towards a distal end thereof, at a distal end of the primary straight-line portion 5A which extends upwards in FIG. 4. On the other hand, parallel and tapered gear teeth 17, which are directed downwards, are formed on both side surfaces of a plate portion 5D, which projects downwards and which is tapered towards a distal end thereof at a distal end of the secondary straight-line portion 5B. An opening (an oscillation center hole which is a through hole) 15, through which the cam member 22 passes, is formed in an intersecting portion between the primary straight-line portion 5A and the secondary straight-line portion 5B.

The lever 7 is formed by bending a plate material in a three-dimensional fashion and has a hexagonal opening (a through hole) 21, which engages with the hexagonal portion 14 of the cam member 22, and a hook portion (a projection) 11 which is formed in the vicinity of the hexagonal opening 21. A handle (not shown) adapted to be gripped by the hand of an operator is designed to be mounted at a distal end of the lever 7. The hook portion 11 may be provided as a separate element in place of being formed by bending part of the lever 7. In the engaging arm 5, a small opening (a receiving portion) 15' is provided in the vicinity of the opening 15 in such a manner as to correspond to the hook portion 11. An engaging means is made up of the hook portion 11 and the small opening 15'.

In assembling, when the annular member 24 is fitted on part of an outer circumference of the circular cylindrical portion of the cam member 22 so that the cam member 22 is passed through the opening 15 in the engaging arm 5, the annular member 24 is made to be positioned between the thin plate 27 of the cam member 22 and a surface of the engaging arm 5 which faces the thin plate 27. As this occurs, a gap is produced between an outer surface of the circular cylindrical portion 16 of the cam member 22 and an inner surface of the opening 15 which accommodates the circular cylindrical portion 16 therein. In addition, by fitting a hollow circular cylindrical member 6 made of an elastic element such as a rubber into the small opening 15' so that the hook portion 11 is brought into engagement with an inner hole of the hollow circular cylindrical member 6, a torque transmissive coupling is implemented, whereby the engaging arm 5 can be made to rotate in response to rotation of the lever 7. Consequently, the engaging arm 5 is supported in such a state that the engaging arm 5 can be displaced relative to the column main body 23 and the lever 7. Furthermore, by passing the hexagonal portion 14 of the cam member 22 into the hexagonal opening 21, the cam member 22 is made to rotate together with the lever 7.

The operation of this embodiment will be described. When the lever 7 is rotated to a position shown in FIG. 1, the engaging arm 5 rotates together through coupling of the hook portion 11 of the lever 7 and the small opening 15' via the circular cylindrical member 6, whereby the gear teeth 18 approach the gear teeth of the tilting gear portion 20 in a tooth trace direction for meshing, and the gear teeth 17 approach the gear teeth 19a of the telescoping gear portion 19 for meshing. By these actions, since the column main body 23 can be fixed to the movable bracket 32 via the engaging arm, for example, even in the event that a large impact force is exerted on the steering column system during a secondary collision, the position of the steering column system can be held in an ensured fashion around the periphery of the clam bolt 1, thereby making it possible to enhance the impact absorbing effect by an air bag. Here, where an external dimension of the hook portion is made smaller than an inside diameter of the circular cylindrical member 6, since the engaging arm 5 does not rotate until the hook portion 11 imparts a force to an inner circumferential surface of the small opening 15', the rotational angle of the engaging arm 5 is made smaller than the rotational angle of the lever 7 as a result thereof, whereby even with a small space, the respective gear teeth can be brought into meshing engagement with and disengagement from each other.

In addition, when the cam member 22 rotates in response to rotation of the lever in a tightening direction, a cam portion (not shown) provided on a back side thereof rides on a cam portion 26 provided on a confronting surface of the cam plate 3 which confronts the back side of the cam member 22, so as to produce an axial tension in the clamp bolt 1, whereby since looseness between a plurality of members provided on the periphery of the clamp bolt 1 is eliminated, the high rigidity of the steering column system can be secured. The annular member 24 having the low frictional properties is disposed between the thin plate 27 of the cam member 22 and the engaging arm 5 and the washer 25 having the low frictional properties is disposed between the lever 7 and the engaging arm 5, whereby a smooth rotation can be realized.

Figure 3:
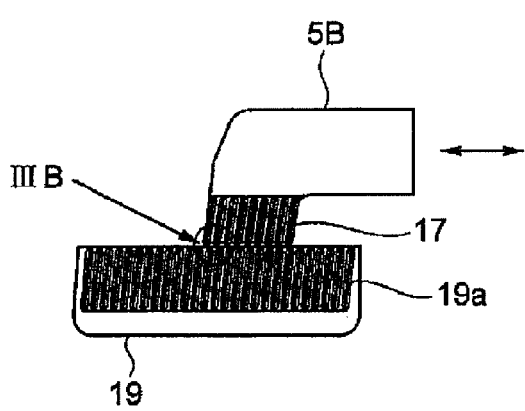
Figure 3:
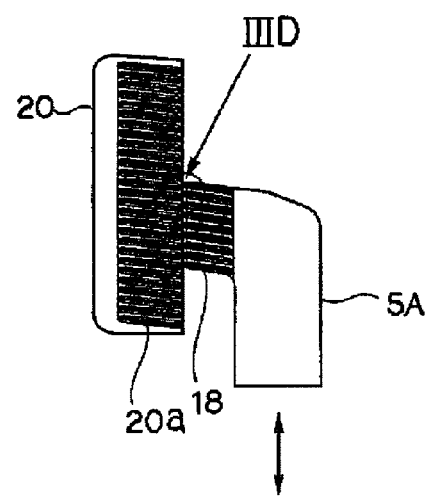
Figure 3:
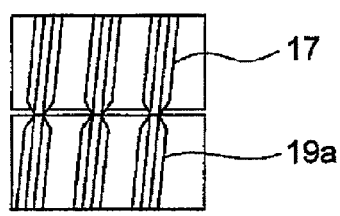
Figure 3:
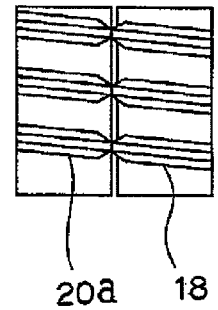

As this occurs, there is a fear that distal ends of the gear teeth 17 of the secondary straight-line portion 5B are brought into abutment with distal ends of the gear teeth 19a of the telescoping gear portion 19, as is shown in FIG. 3(b). In addition, there is a fear that distal ends of the gear teeth 18 of the primary straight-line portion 5A are brought into abutment with distal ends of the gear teeth 20a of the tilting gear portion 20, as is shown in FIG. 3(d). However, since the gap exists between the outer surface of the circular cylindrical portion 16 of the cam member 22 and the inner surface of the opening 15 which accommodates therein the circular cylindrical portion 16, the engaging arm 5 is displaced relative to the clam bolt 1 within a predetermined range which is limited through elastic deformation of the circular cylindrical member 6, whereby the distal ends of the gear teeth are offset from each other in a direction indicated by arrows in FIG. 3(a) or FIG. 3(c), thus improving the operating feeling of the operation lever and facilitating the meshing of the gear teeth.

In contrast to this, when the lever 7 is rotated in a direction indicated by an arrow from the position shown in FIG. 1 in an attempt to adjust the position of the column, since the gear teeth 18 are released from the gear teeth 20a of the tilting gear portion 20 and the gear teeth 17 are released from the gear teeth 19a of the telescoping gear portion 19, the coupled state by the engaging arm 5 is released, whereby the column main body 23 can be displaced relative to the movable bracket 32. By rotating the lever 7 to the position shown in FIG. 1 after the column main body 23 has been shifted to arbitrary telescoping and tilt positions, the column main body 23 can be fixed in place.

Figure 5:
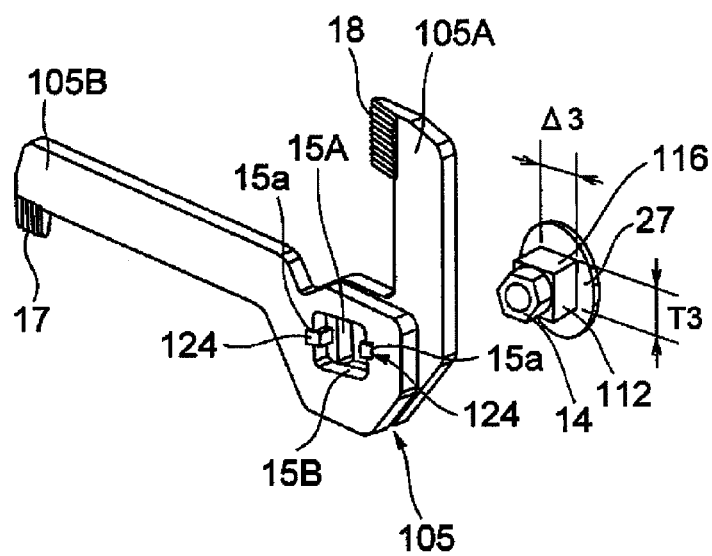
Figure 5:
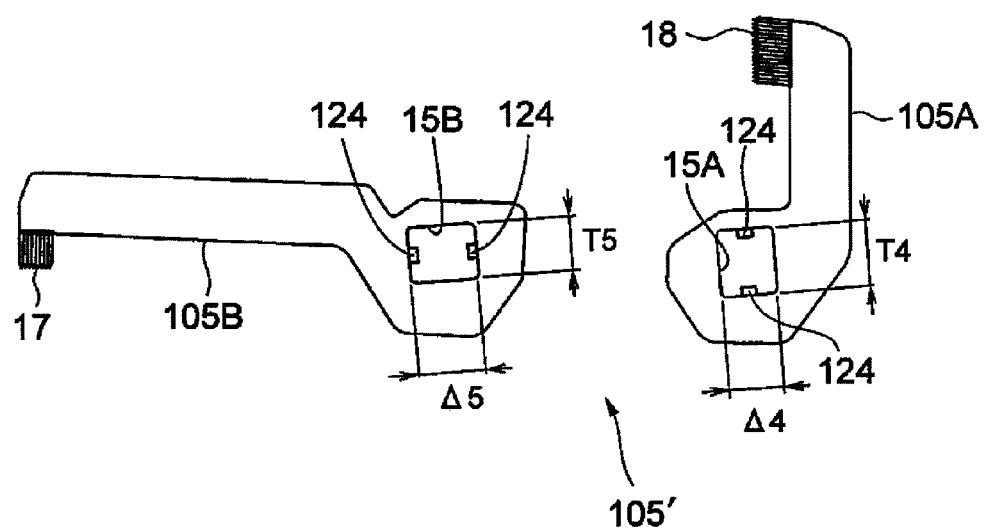

FIG. 5(a) is a perspective view of an engaging arm 105 and a cam member 112 according to a second embodiment, and FIG. 5(b) is an exploded side view of an engaging arm 105' according to a modified example thereto. Although the engaging arm 5 shown in FIG. 5 is formed integrally, in this embodiment, the engaging arms are made up of separate members. To describe more specifically, in a straight-line member 105A, a rectangular opening 15A is formed in an opposite end portion to gear teeth 18, and in a secondary straight-line member 105B, a rectangular opening 15B is formed in an opposite end portion to gear teeth 17. In particular, in the example shown in FIG. 5(a), in the rectangular opening 15B, grooves 15a are formed on internal surfaces thereof which confront each other in a horizontal direction, respectively, and angular cylindrical elastic elements 124, 124 which are made of a rubber of the like are disposed to be fitted in the grooves so formed. In addition, although not shown, similar grooves are formed on internal surfaces of the rectangular opening 15A which confront each other in a vertical direction, respectively, and angular cylindrical elastic elements 124, 124 which are made of a rubber of the like are disposed to be fitted in the grooves so formed. In contrast to this, in the example shown in FIG. 5(b), angular cylindrical elastic elements 124, 124 which are made of a rubber of the like are bonded to internal surfaces of the rectangular opening 15B which confront each other in the horizontal direction. In addition, angular cylindrical elastic elements 124, 124 which are made of a rubber of the like are bonded to internal surfaces of the rectangular opening 15A which confront each other in the vertical direction. The example of FIG. 5(a) and the example of FIG. 5(b) are the same other than the features with respect to the mounting of the elastic elements 124, 124.

As is shown in FIG. 5(a), the hollow cam member 112 has a configuration in which a thin plate 17, an angular cylindrical portion 116 and a hexagonal portion 14 are coupled together coaxially. A width $\Delta 3$ of the angular cylindrical portion 116 is trade almost equal to a width $\Delta$ of the primary straight-line member 105A but is made smaller than a width $\Delta 5$ of the rectangular opening 15B of the secondary straight-line member 105B. In addition, a height T3 of the angular cylindrical portion 116 is made 15 almost equal to a height T5 of the rectangular opening 15B of the secondary straight-line member 105B but is made smaller than a height T4 of the rectangular opening 15A of the primary straight-line member 105A. Since this embodiment is similar in the other configurations than those that have just been described above to the embodiment that has been described before, the description thereof will be omitted.

In assembling, when the cam member 112 is passed into the rectangular openings 15A, 15B, the rectangular openings 15A, 15B are positioned outwards of the angular cylindrical portion 116 of the cam member 112. As this occurs, since the primary straight-line member 105A can be displaced in the tilting direction relative to the angular cylindrical portion 116 within a predetermined range, meshing of the gear teeth 18 with gear teeth 20a (FIG. 2) of a tilting gear portion 20 can be implemented smoothly. In addition, the secondary straight-line member 105B can be displaced in the telescoping direction relative to the angular cylindrical portion 116 within a predetermined range, whereby meshing of the gear teeth 17 with gear teeth 19a of a telescoping gear portion 19 can be implemented smoothly. In this way, by making the primary straight-line member 105A and the secondary straight-line member 105B be displaced independently, a meshing failure can be avoided which results from the abutment of the distal ends of the gear teeth.

On the other hand, since the width $\Delta 3$ of the angular cylindrical portion 116 is almost equal to the width 44 of the secondary straight-line member 105A and the height T3 of the angular cylindrical portion 116 is almost equal to the height T5 of the secondary straight-line member 105B, when the cam member 112 is rotated together with a lever 7 (FIG. 2), the engaging arm 105 can follow the rotation of the lever 7 without looseness so as to secure a direct or integral feeling, thereby making it possible to enhance the operation feeling. Furthermore, the angular cylindrical portion 116 can be positioned to be in the center of the rectangular opening 15B by virtue of a biasing force resulting from elastic deformation of the elastic elements 124, 124 which are disposed within the rectangular opening 15B.

Figure 6:
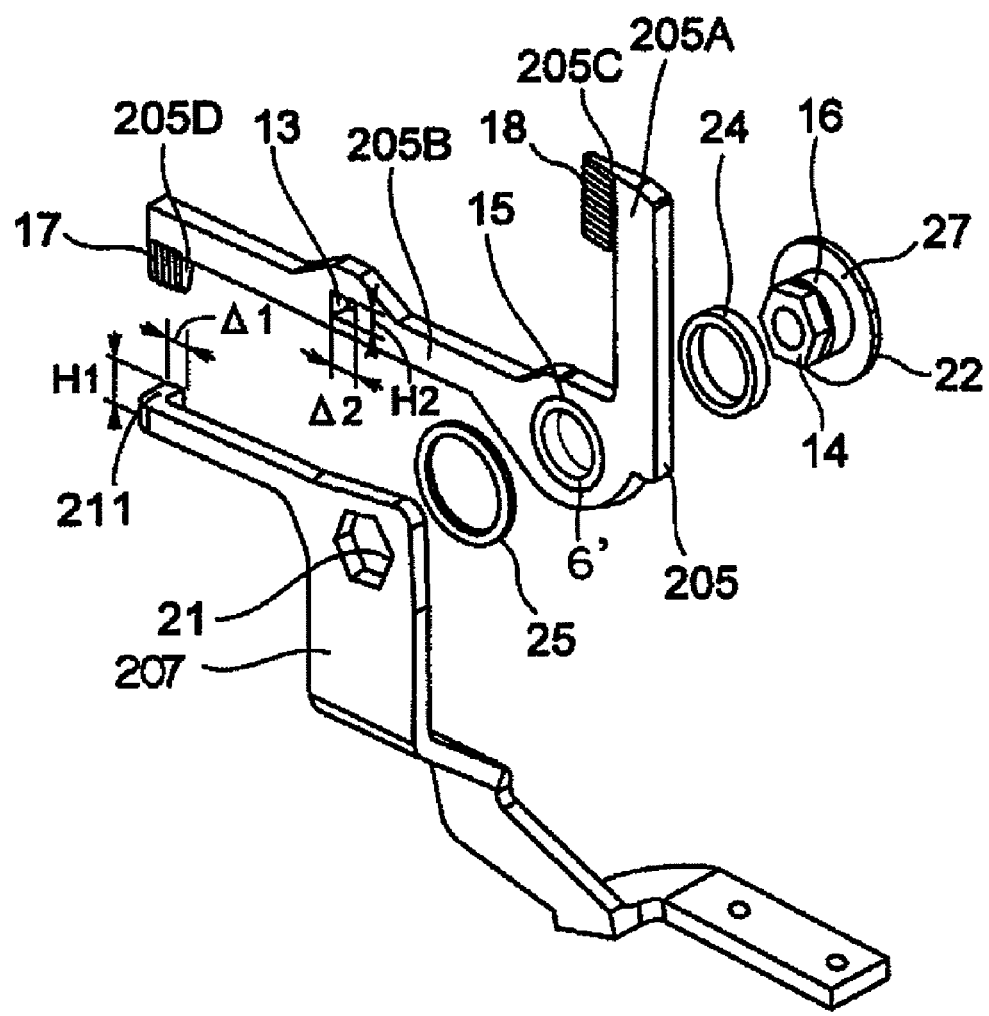
FIG. 6 A perspective view of a lever 207, an engaging arm 205 and a cam member 22 according to a third embodiment.

FIG. 6 is a perspective view of a lever 207, an engaging arm 205 and a cam member 22 according to a third embodiment. In this embodiment, in contrast to the embodiment shown in FIG. 4, in the lever 207, in place of providing the hook portion in the vicinity of the hexagonal opening 21, a hook portion 211 is provided which extends along a secondary straight-line portion 205B of the engaging arm 205. A rectangular opening 13 is formed in the secondary straight-line portion 2053 of the engaging arm 205 between gear teeth 17 and an opening 15. The width of the rectangular opening 13 is $\Delta 2$ and the height thereof is H2.

On the contrary to this, the height of a distal end of the hook portion 211 is H1, which is almost equal to the height H2 of the rectangular opening 13, while a width $\Delta 1$ of the distal end of the hook portion 211 is made smaller than the width $\Delta 2$ of the rectangular opening 13. Since this embodiment is similar in the other configurations than those that have just been described above to the embodiment that has been described before, the description thereof will be omitted.

In assembling, since the hook portion 211 of the lever 207 engages with the rectangular opening 13 (preferably, with the center thereof) of the engaging arm 205, the engaging arm 205 can be rotated in response to rotation of the lever 207 through the coupling thereof. Here, a gap is provided between an inner surface of the opening 15 of the engaging arm 205 and an outer surface of a circular cylindrical portion 16 of a cam member 22, and an elastic element 6' is inserted into the gap, so that the engaging arm 205 is positioned in the center relative to a clamp bolt 1. In addition, since the height H1 of the hook portion 211 of the lever 207 is almost equal to the height H2 of the rectangular opening 13 of the engaging arm 205, in a condition where distal ends of gear teeth 205D and gear teeth with which the gear teeth 205D mesh correspondingly are brought into abutment with each other so as to be likely to cause a meshing failure, the engaging arm 205 slides relative to the lever 207 using the rectangular opening 13 as a guide so as to enable a good meshing. Furthermore, in the condition where the distal ends of the gear teeth 205D and the gear teeth with which the gear teeth 205D mesh correspondingly are brought into abutment with each other so as to be likely to cause a meshing failure, operating effort exerted on the lover 207 acts on the engaging arm 205 rotationally about the rectangular opening 13 so as to enable a good meshing. Consequently, the engaging arm 205 can follow the rotation of the lever 207 without looseness so as to secure a direct or integral feeling, thereby making it possible to enhance the operation feeling. In addition, as is shown in FIG. 6, since the width $\Delta 1$ of the hook portion 211 of the lever 207 is made smaller than the width $\Delta 2$ of the rectangular opening 13 of the engaging arm 205, in conjunction with effects of an annular member 24 and a washer 25 which both have low frictional properties, a smooth relative displacement of the engaging arm 205 relative to the lever can be permitted. The elastic element 6' may be omitted so that the inner surface of the opening 15 of the engaging arm 205 confronts directly the outer surface of the circular cylindrical portion 16 of the cam 22.

Figure 10:
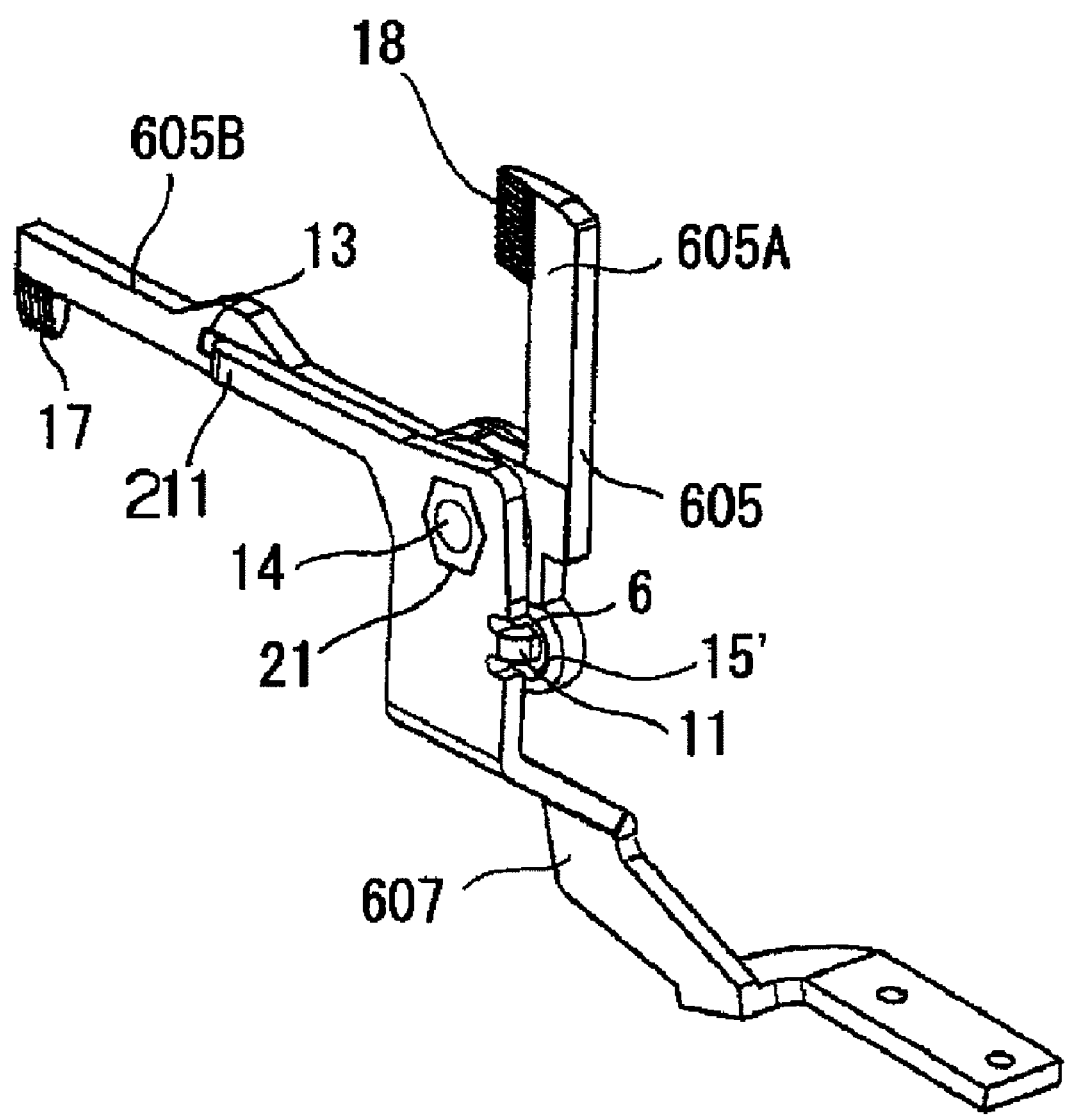
FIG. 10 A perspective view showing a state in which a lever 607 and an engaging arm 605 according to a modified example are combined together.

FIG. 10 is a perspective view showing a state in which a lever 607, an engaging arm 605 and a cam member according to a modified example of the embodiment are assembled together. In this modified example, the lever 607 has a hook portion 211 and a hook portion 11, and the engaging arm 605 has a rectangular opening 13 and a small opening 15' in which a hollow circular cylindrical elastic element 6 is fitted. By bringing the hook portion 211 into engagement with an interior of the rectangular opening 13 and bringing the hook portion 11 into engagement with an interior of the small opening 15' via the elastic element 6, the lever 607 and the engaging arm 605 are mounted in such a manner as to be displaced relatively to each other. Since this modified example is similar in the other configurations than those that have just been described above to the embodiment that has been described before, the description thereof will be omitted.

Figure 7:
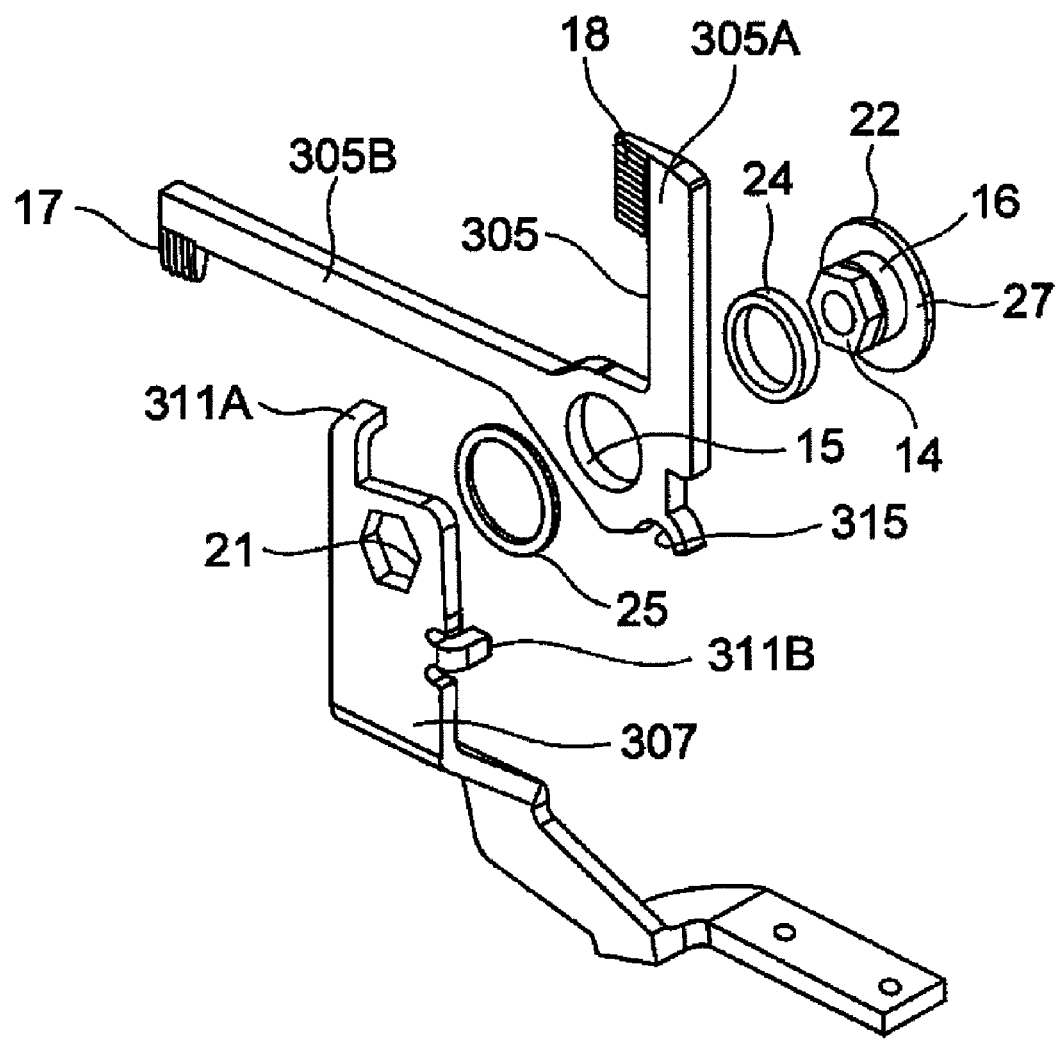
FIG. 7 A perspective view of a lever 307, an engaging arm 305 and a cam member 22 according to a fourth embodiment.

FIG. 7 is a perspective view of a lever 307, an engaging arm 305 and a cam member 22 according to a fourth embodiment. In this embodiment, in contrast to the embodiment shown in FIG. 6, a pair of hook portions 311A, 311B is provided on the lever 307, and in place of the small opening, an engaging portion 315 is provided on the engaging arm 305 in such a manner as to project from the engaging arm 305. Since this embodiment is similar in the other configurations than those that have just been described above to the embodiment shown in FIG. 6, the description thereof will be omitted. An engaging means is made up of the hook portions 311A, 311B, a secondary straight-line portion 305B and the engaging portion 315.

In assembling, the hook portion 311A is positioned on the secondary straight-line portion 305B, and the hook portion 311B is positioned on the engaging portion 315. When the lever 307 is rotated counterclockwise in that state, the hook portion 311B comes into abutment with the engaging portion 315, so as to rotate the engaging arm 305 in the same direction. As a function of the fourth embodiment, in the event that a meshing failure occurs between gear teeth 17 and a gear with which the gear teeth 17 mesh correspondingly when the lever 307 is tightened, the engaging arm 305 slides relative to the lever 307 using the hook portion 311A as a guide so as to enable a good meshing. Furthermore, in the event that there is a meshing failure on the side of gear teeth 18, operating effort exerted on the lever 307 acts on the engaging portion 315 rotationally abut the vicinity of the hook portion 311A relative to the engaging arm 305 so as to enable a good meshing. Here, by setting appropriately a positional relationship between the hook portion 311A and the secondary straight-line portion 305B and a positional relationship between the hook portion 311B and the engaging portion 315, the rotational angle of the engaging arm 305 can be made smaller by an arbitrary amount than the rotational angle of the lever 307, even with a small space available, the respective gear teeth can mesh with and be released from each other.

Figure 8:
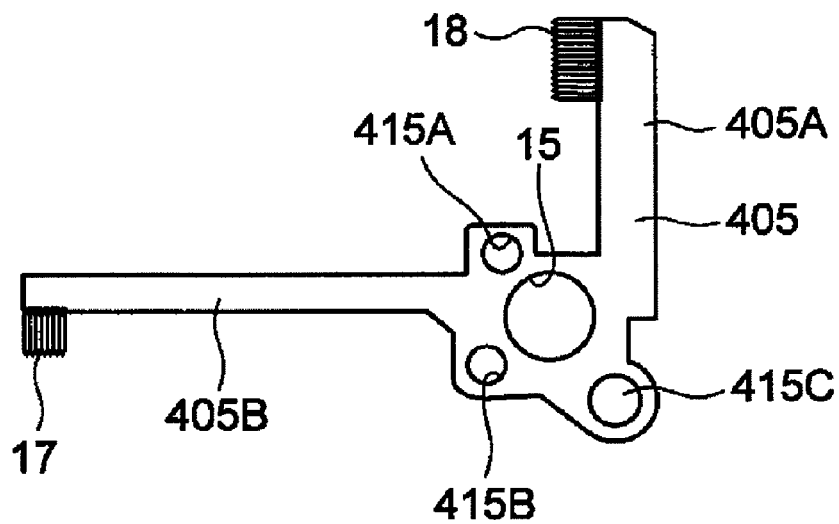
Figure 8:
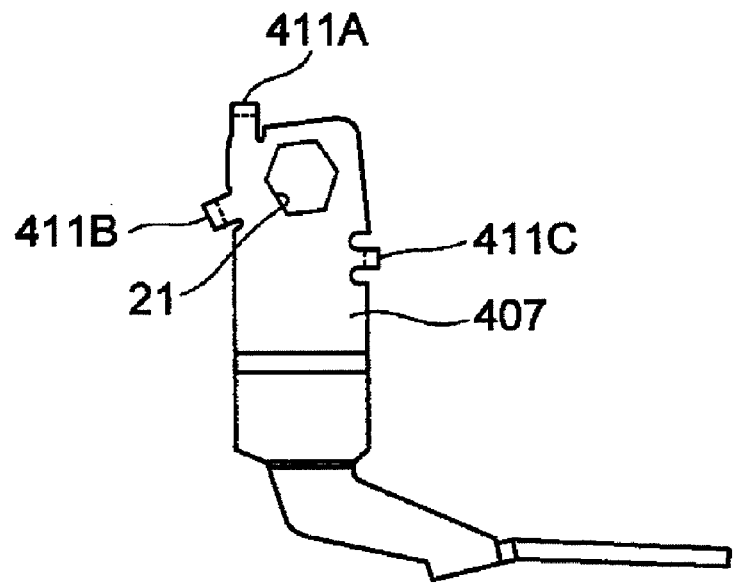

FIG. 8(a) is a side view of an engaging arm 405 according to a fifth embodiment, and FIG. 8(b) is a side view of a lever 407 according to the fifth embodiment. This embodiment differs from the others in that in the lever 407, three hook portions 411B, 411B, 411C are provided on the periphery of a hexagonal opening 21, while three small openings 415A, 415B, 415C are provided on the periphery of an opening 15 in the engaging arm 405 in such a manner as to confront the hook portions. Since this embodiment is similar in the other configurations than those that have just been described above to the embodiment shown in FIG. 6, the description thereof will be omitted. An engaging means is made up of the hook portions 411A to 411C and the small openings 415A to 415C.

In assembling, since the hook portions 411A to 411C engage with interiors of the small openings 415A to 415C, respectively, the engaging arm 405 can be rotated in response to rotation of the lever 407 through coupling thereof. By increasing the number of engaging portions in this way, stress in each hook portion can be reduced. In addition, as is shown by a solid line in FIG. 4, circular cylindrical members 6 are preferably fitted in the small openings 415A to 415C, respectively.

Figure 9:
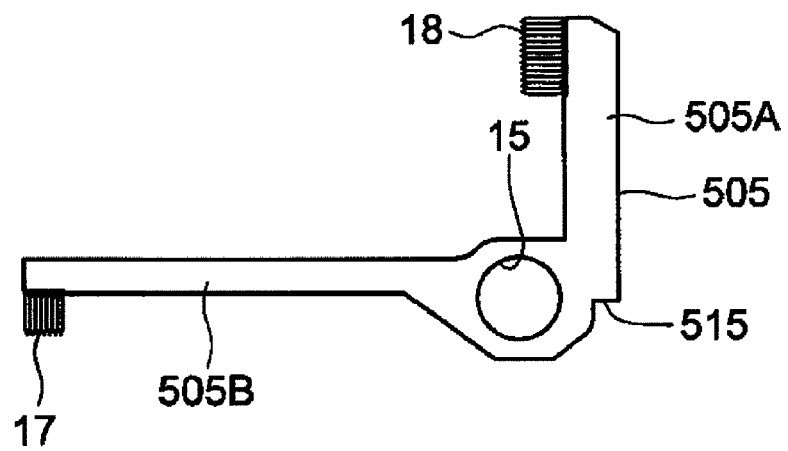
Figure 9:
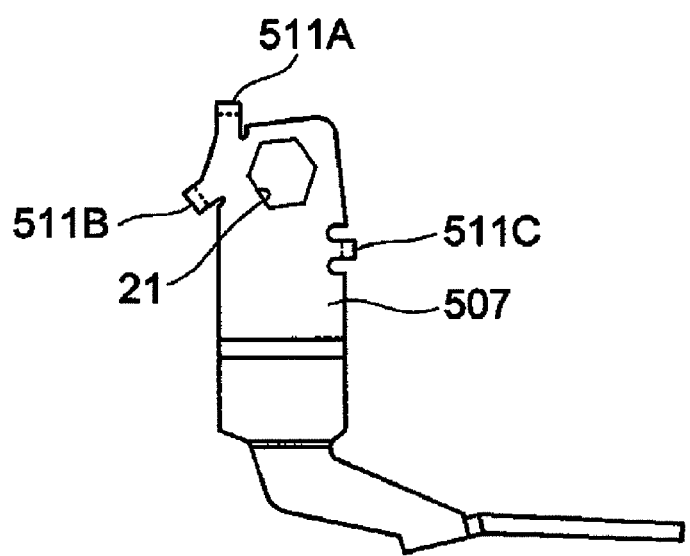

FIG. 9(a) is a side view of an engaging arm 505 according to a sixth embodiment, and FIG. 9(b) is a side view of a lever 507 according to the sixth embodiment. In this embodiment, no small opening is provided in the engaging arm 505. The lever 507 has a similar shape to that of the lever 407 shown in FIG. 8(b). An engaging means is made up of hook portions 511A to 511C, a secondary straight-line portion 505B and an engaging portion 515.

In assembling, the hook portion 511A is positioned on the secondary straight-line portion 505B, the hook portion 511B is positioned underneath the secondary straight-line portion 505B, and the hook portion 511C is position underneath a stepped portion 515. When the lever 507 is rotated counterclockwise in that state, the hook portion 511A comes into abutment with an upper surface of the secondary straight-line portion 505B and the hook portion 511C comes into abutment with the engaging portion 515, whereby the engaging arm 505 is rotated in the same direction. On the other hand, when the lever 507 is rotated clockwise, the hook portion 511B comes into abutment with a lower surface of the secondary straight-line portion 505, whereby the engaging arm 505 is rotated in the same direction.

Figure 11:
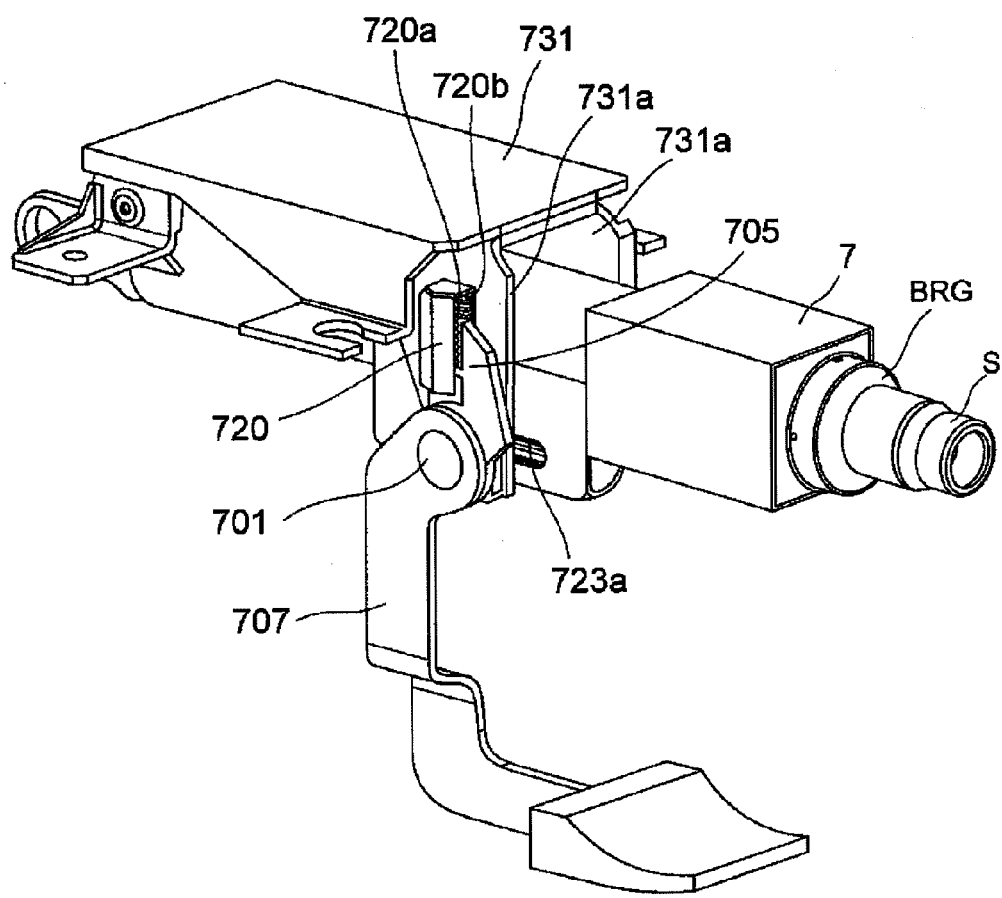
FIG. 11 A perspective view of a steering column system according to another embodiment.
Figure 12:
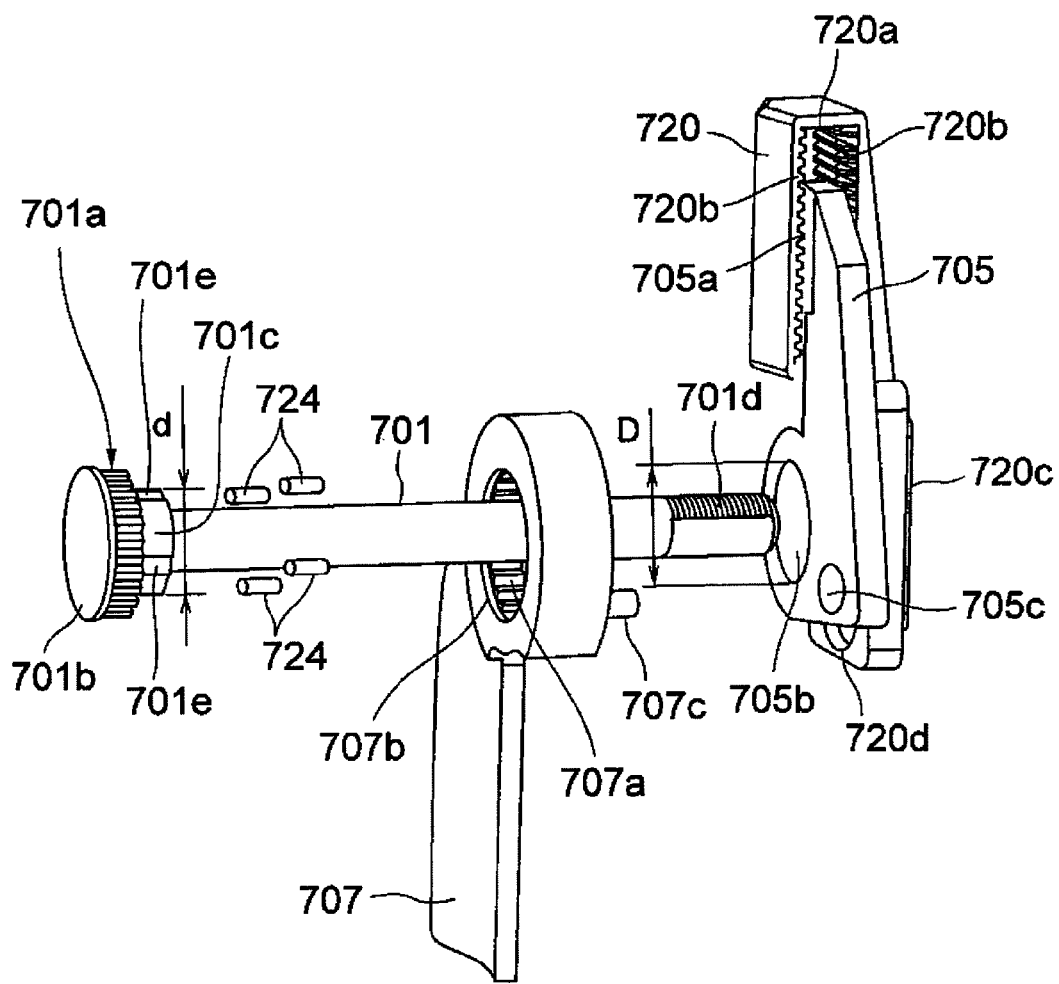
FIG. 12 A diagram showing the vicinity of a lever in an enlarged fashion.

Next, a farther embodiment will be described, FIG. 11 is a perspective view showing a steering column system according to the further embodiment, and FIG. 12 is a diagram showing the periphery of a root of a lever in an enlarged fashion.

A column main body 723 is designed to be mounted on a body, not shown, via a stationary bracket 731. A steering shaft S, which couples a steering wheel, not shown, to a steering mechanism, is passed into the column main body 723 and is supported rotatably by bearings BRG.

A pair of side plates 731a, 731a, which extend downwards, is formed on a lower surface of the stationary bracket 731 in such a manner as to be brought into abutment with both side surfaces of the column main body 723. A raised portion 720c (FIG. 12) of a tilt position fixing gear portion 720 fits in a recessed portion (not shown) on the side plate 731a which is situated on a near side of FIG. 11, whereby the tilt position fixing gear portion 720 is mounted on the stationary bracket 731. In the tilt position fixing gear portion 720, which is formed into a thin box shape, an opening 720a is formed on a side thereof and straight-line teeth 720b are formed on confronting inner surfaces thereof. The tilt position fixing gear portion 720 has a height which corresponds to a position adjusting width in the tilting direction on the column main body 723. An elongated hole, not shown, is formed on the stationary bracket 731 in such a manner as to correspond to the position adjusting width in the tilting direction.

An operation lever (an adjusting arm) 707 is mounted on a rotatable shaft (a position adjusting bolt) 701 which passes through the elongated hole [in an inside of which an elongated hole 720d (FIG. 12) exists which is formed in the tilt position fixing gear portion 720 in the tilting direction], not shown, which is provided in the stationary bracket in the tilting direction in such a manner that the shaft and the lever rotate integrally.

As is shown in FIG. 12, the shaft 701 has a disc-like head portion 701b which is formed on a near side end thereof and on which external serrations 701a are formed, an engaging portion 701c which is formed in adjacent to the head portion 701b and an external thread portion 701d which is formed at the other end thereof. Four semi-cylindrical recessed portions are formed on an outer circumference of a cylindrical portion of the engaging portion 701c at equal intervals.

An engaging arm 705 has teeth 705a which are provided on both sides of one end thereof and which are adapted to engage with the teeth 720b of the tilt position fixing gear portion 720, an opening (an oscillation center hole) 705b which is formed in the other end thereof and through which the shaft 701 is passed and a small opening 705c formed in the vicinity of the opening 705b. The operation lever 707 has an opening 707b which is formed in an end portion thereof and which has internal serrations 707a on an inner circumference thereof and a projection 707c which projects from a side surface thereof.

In assembling, firstly, the projection 707c of the operation lever 707 is brought into engagement with the small opening 705c of the engaging arm 705 with slight looseness left therebetween. In this state, a circular cylindrical elastic element 724, which is made of a rubber, is loaded in each of the recessed portions 701e on the engaging portion 701c of the shaft 701 for positioning, and the shaft 701 is then inserted sequentially from the external thread portion 701d side into the opening 707b in the operation lever 707, the opening 705b in the engaging arm 705 and the elongated hole 720d in the tilt position fixing gear portion 720. As this occurs, the external serrations 701a on the shaft 701 engage with the internal serrations 707a on the operation lever 707, whereby both the shaft and the lever are made to rotate integrally. In addition, the engaging portion 701c of the shaft 701 is made to be positioned within the opening 705a in the engaging arm 705. In this state, the elastic element 724 is made to be positioned between the engaging portion 701c and the opening 705b. Furthermore, after having passed through the side plate 731a of the bracket 731, the column main body 23, and the side plate 731a of the bracket 731, the shaft 701 is fixed in place (refer to FIG. 11) by screwing the external thread portion 701d into a nut not shown, via a cam type rotary clamping mechanism, not shown.

The cam type rotary clamping mechanism has a function to hold the column main body 723 between the side plates 731a, 731a by producing an axial tension in the shaft by virtue of a cam effect by operating the operation lever 707 rotationally. In addition, by imparting a stopper mechanism for the operation lever 707 to the cam type rotary clamping mechanism, a contact ratio of the teeth 720b of the tilt position fixing gear portion 720 and the teeth 705a of the engaging arm 705 can be fixed in an optimal position.

When the operation lever 707 is rotated to a position shown in FIG. 11, the engaging arm 705 rotates together therewith through coupling of the projection 707c of the operation lever 707 to the small opening 705c of the engaging arm 705, and the teeth 705a of the engaging arm 705 move closer to the teeth 720b of the tilt position fixing gear portion 720 in a tooth trace direction for meshing therewith, whereby the column main body 723 can be fixedly positioned relative to the stationary bracket 731 via the engaging arm 705.

In contrast to this, when the operation lever 707 is rotated in a releasing direction from the position shown in FIG. 11, since the teeth 705a of the engaging arm 705 are released from the teeth 720b of the tilt position fixing gear portion 720, a tilt position adjustment can be enabled.

In this embodiment, assuming that an inside diameter D of the opening 705b of the engaging arm 705 is 14 mm and an outside diameter d of the engaging portion 701c of the shaft 701 is 12 mm, for example, a radial gap G between the opening 705b and the engaging portion 701c becomes (D−d)/2=1 mm. The engaging arm 705 is enabled to move relative to the shaft 701 while being restricted with respect to its moving amount relative thereto by the gap G. In addition, a recessed portion may be provided on an inner circumference of the opening 705b so as to mount an elastic element 724 therein or a raised portion may be provided on the inner circumference of the opening 705b so as to place a hollow elastic element thereon.

When the vehicle is involved in a collision, there may be caused a case where the driver is forced to collide against the steering column due to a secondary collision. An impact produced then is transmitted to the tilt position fixing gear portion 720 which is fixed to the vehicle side via the column main body 723, the shaft 701 and the engaging arm 705. As this occurs, since the teeth of the engaging arm 705 are meshing with those of the tilt position fixing gear portion 720 and moreover is restricted with respect to its moving amount relative to the shaft 701, there is no chance for the column main body 723 to lose its posture. Since the function of the elastic element 724 is similar to what has been described in the previously described embodiments, the description thereof will be omitted here. Thus, while the meshing operation between the tilt position fixing gear portion 720 and the engaging arm 705 has been described, a meshing operation in the telescoping direction is basically the same.

Figure 13:
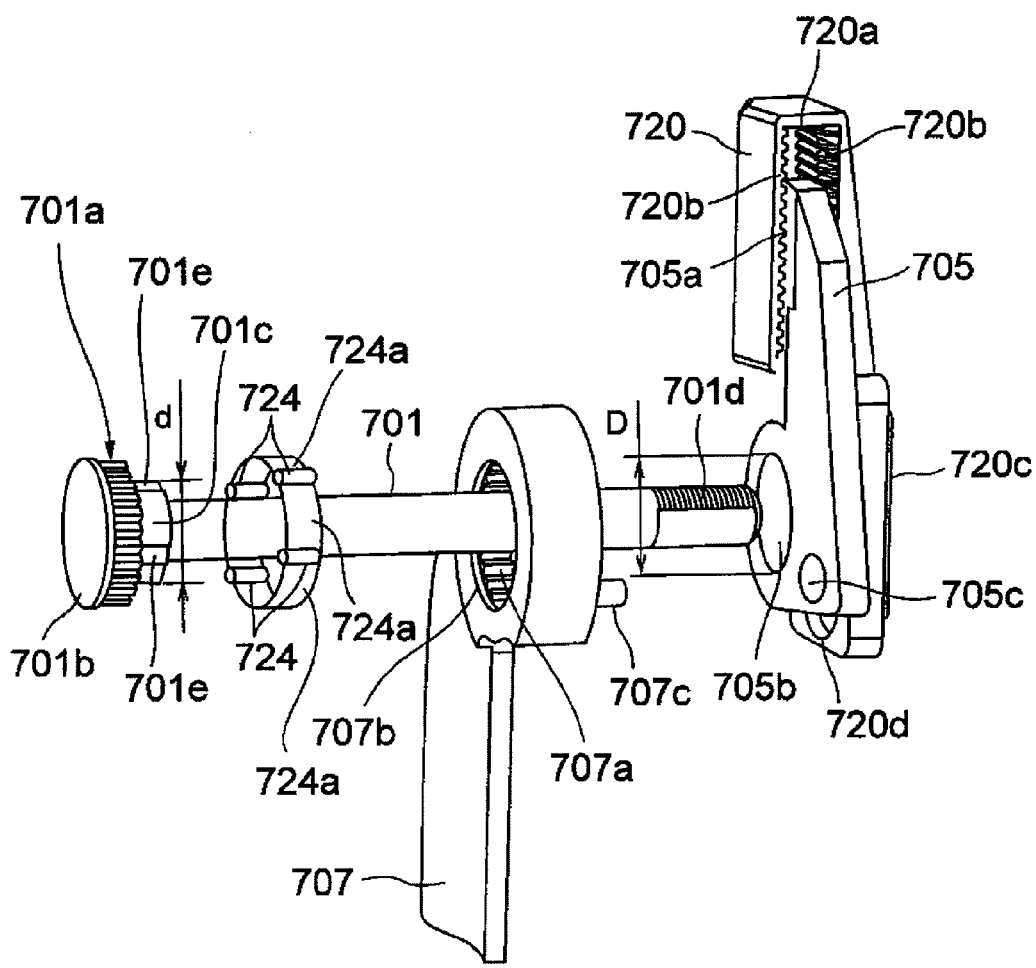
FIG. 13 A diagram similar to FIG. 12, which shows an modified example of the embodiment.

FIG. 13 is a diagram similar to FIG. 12, which shows a modified example to this embodiment. In this modified example, a configuration is adopted in which adjacent elastic elements 724 are coupled to each other by thin plate-like thin belt portions 724a (which are shown as being extended more than in reality). The elastic elements 724 and the thin belt portions 724a can be formed integrally as a whole. Since the other features than this are the same as those of the embodiments that have been described heretofore, the description thereof will be omitted by giving like reference numerals to like portions.

According to this embodiment, since the elastic elements 724 and the thin belt portions 724a which are formed into an annular shape can elastically be expanded in diameter so as to be mounted on the engaging portion 701c, the mounting becomes easy, and there is no chance for the annular assembly to be dislocated unintentionally once it has been so mounted. Consequently, the annular assembly of elastic elements 724 and thin belt portions 724a is advantageous in that it is easy to be manufactured and has superior assembling and handling properties.

Figure 14:
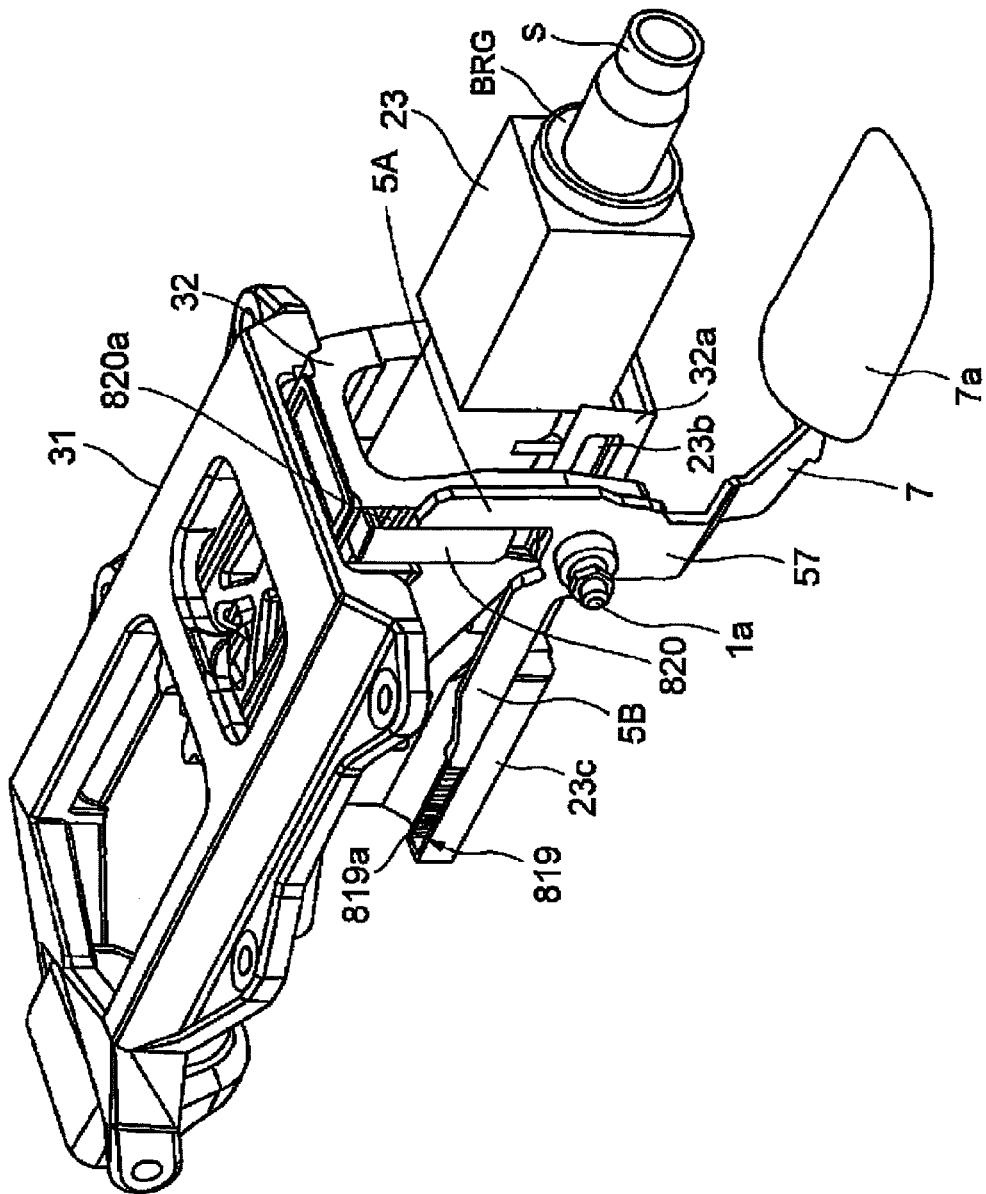
FIG. 14 A perspective view of a steering column system according to a further embodiment.
Figure 15:
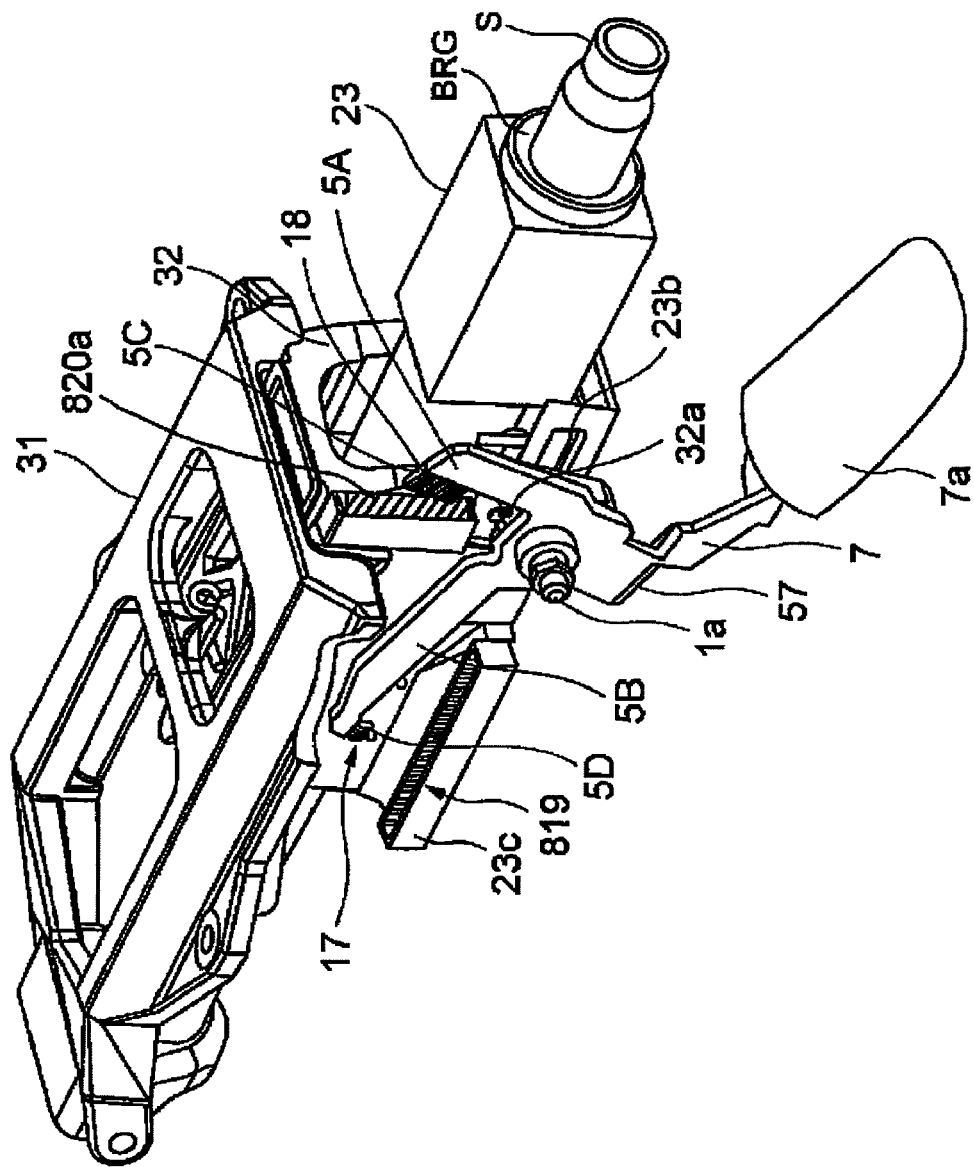
FIG. 15 A perspective view of a steering column system according to an embodiment.

FIGS. 14, 15 are perspective views showing a steering column system according to a further embodiment, of which FIG. 14 shows a state in which gears are in mesh with each other and FIG. 15 shows a state in which they are released from each other. A movable bracket 32 having an inverted U-shape cross section is mounted underneath a stationary bracket 31 mounted on a body, not shown. While the movable bracket 32 is normally fixed to the stationary bracket 31, when it is subject to an impact, the movable bracket 32 is designed to be displaced in the telescoping direction.

A cylindrical column main body (also, referred to simply as a column) 23 is mounted in such a manner as to be accommodated in the movable bracket 32. A steering shaft S, which couples a steering wheel not shown, to a steering mechanism, is passed into the column main body 23 and is rotatably supported relative to the column main body 23 by bearings BRG. A telescoping gear portion 819 is mounted on a side of the column main body 23. The telescoping gear portion 819 will be described later.

Elongated hole-like telescoping holes 23b are formed in a box 23a, which is formed underneath the column main body 23, in such a manner as to extend in the telescoping direction. In addition, elongated hole-like tilting holes 32a (FIG. 15) are formed in sides of the movable bracket 32 in such a manner as to extend in the tilting direction and a tilting gear portion 820 is formed on one of the sides of the movable bracket 32. Gear teeth 820a are formed on both internal side surfaces of the tilting gear portion 820.

A rotatable clamp bolt (a position adjusting bolt) 1, which passes through the tilting holes 32a provided in the movable bracket 32 and the telescoping holes 23b provided in the column main body 23, passes through a cam type clamping mechanism (also, referred to as a cam mechanism), not shown, and an engaging arm (also, referred to as an operation lever) 57 which is formed integrally with a lever 7 and is thread fastened by a nut 9. In addition, by imparting a stopper mechanism for the engaging arm 57 to the cam type clamping mechanism, a contact ratio of the respective teeth can be adjusted to fall in an optimal range.

The engaging arm 57 is made up of an integrally formed plate material in which a primary straight-line portion 5A and a secondary straight-line portion 5B are made to intersect each other at right angles and are then coupled to the lever 7, and gear teeth 18 are formed on both side surfaces of a plate portion 5C, which projects horizontally and which is tapered towards a distal end thereof at a distal end of the primary straight-line portion 5A which extends upwards in FIG. 4. On the other hand, parallel and tapered gear teeth (primary gear teeth) 17, which are directed downwards, are formed on both side surfaces of a plate portion 5D, which projects downwards and which is tapered towards a distal end thereof, at a distal end of the secondary straight-line portion 5B, A handle 7a which can be gripped by the hand of an operator is mounted at a distal end of the lever 7. By rotating the lever 7 around the circumference of the clamp bolt 7, the primary straight-line portion 5A and the secondary straight-line portion 5B also rotate together therewith.

Figure 16:
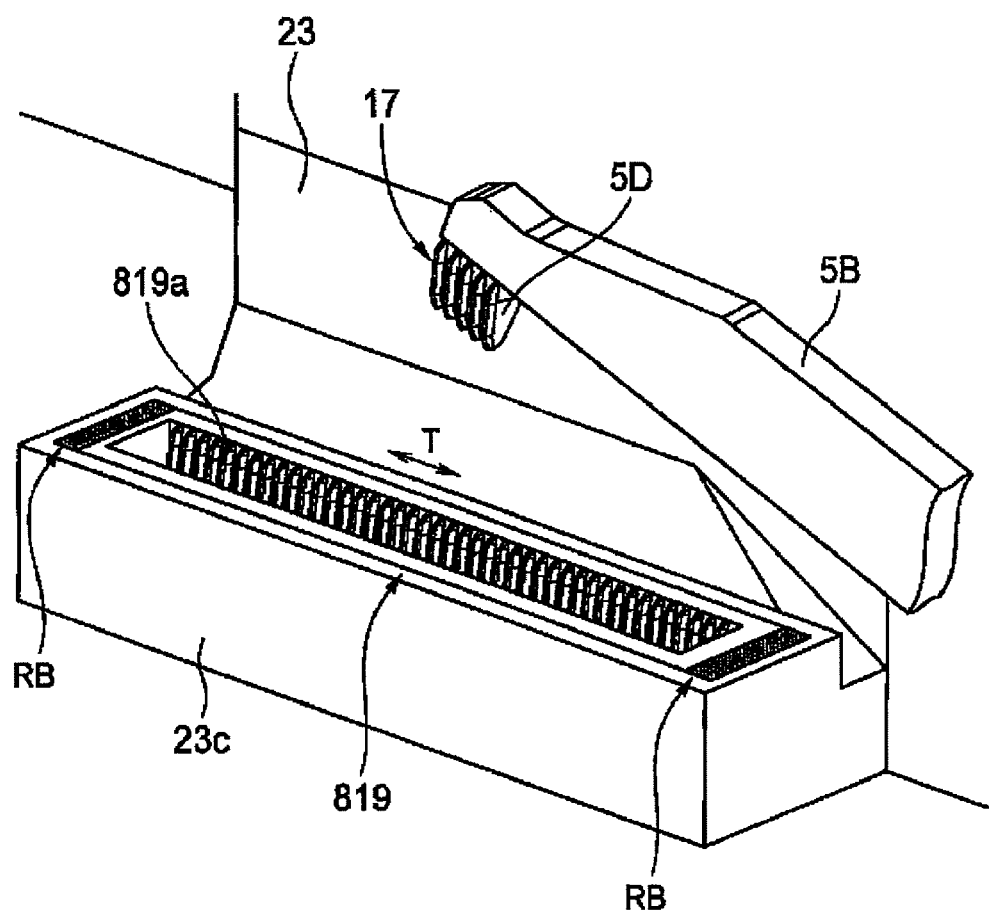
FIG. 16 A diagram showing the periphery of a telescoping gear portion 819 in an enlarged fashion.
Figure 17:
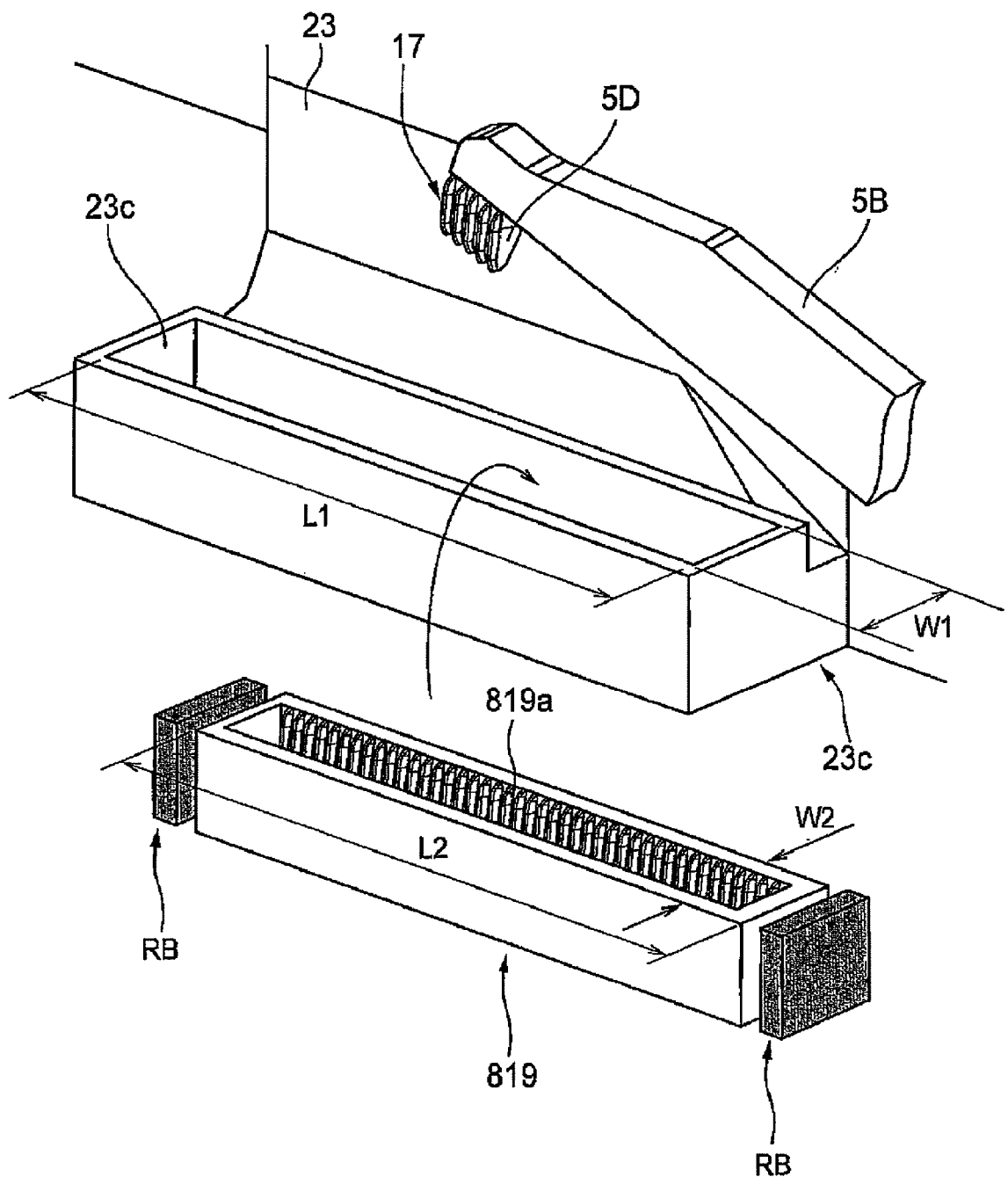
FIG. 17 A diagram showing the periphery of the telescoping gear portion 819 in an enlarged fashion.
Figure 18:
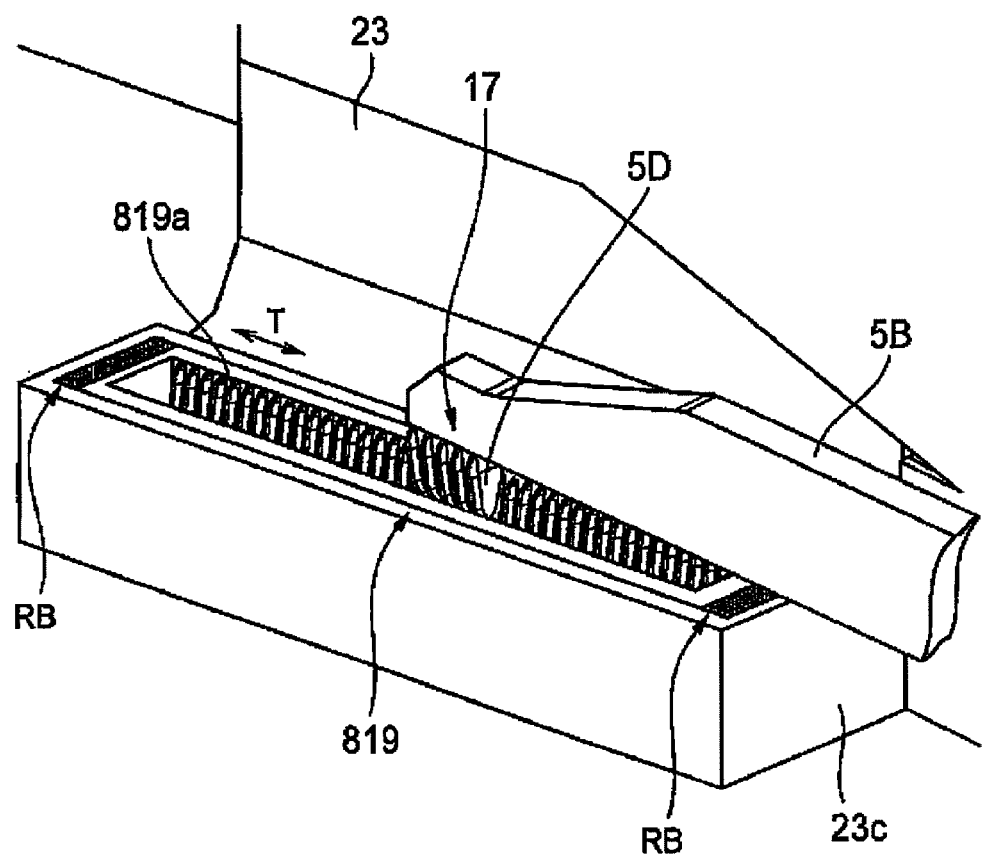
FIG. 18 A diagram showing the periphery of the telescoping gear portion 819 in an enlarged fashion.

FIGS. 16 to 18 are diagrams showing the periphery of the telescoping gear portion 819 in an enlarged fashion. As is shown in FIG. 17, an accommodating portion 23c having a rectangular parallelepiped space is formed on the column main body 23. The telescoping gear portion 819, which is formed into the shape of a box which is opened on an upper side, is accommodated in the accommodating portion 23c. a width W1 and a length L1 of the rectangular parallelepiped space in the accommodating portion 23c are made larger than a width W2 and a length L2 of the telescoping gear portion 819, and consequently, the telescoping gear portion 819 is held within the accommodating portion 23c in such a manner as to be displaced in a longitudinal direction (that is, the telescoping direction) in a smooth fashion without any looseness within a predetermined range. Plate-shaped rubbers RB, RB, which are elastic elements, are disposed between the accommodating portion 23c and longitudinal ends of the telescoping gear portion 819, respectively. Gear teeth (secondary gear teeth) 819a are formed on both side surfaces of the telescoping gear portion 819 which extend in the longitudinal direction in such a manner as to be aligned parallel in the telescoping direction. Note that the telescoping gear portion 819 has the same configuration as that of the tilting gear portion 820.

The operation of this embodiment will be described. When the lever 7 is rotated to a position shown in FIG. 14, the engaging arm 57 rotates together therewith, whereby the gear teeth 18 approach the gear teeth 820a of the tilting gear portion 820 for meshing, and the gear teeth 17 approach the gear teeth 819a of the telescoping gear portion 819 for meshing. By these actions, since the column main body 23 can be fixed to the movable bracket 32 via the engaging arm 57, for example, even in the event that a large impact force is exerted on the steering column system during a secondary collision, the position of the steering column system can be held in an ensured fashion around the periphery of the clam bolt 1, thereby making it possible to enhance the impact absorbing effect by an air bag.

In addition, when a cam member, not shown, rotates in response to rotation of the lever 7 in a tightening direction, an axial tension is produced in the clamp bolt 1 as has been described above, whereby since looseness between a plurality of members provided on the periphery of the clamp bolt 1 is eliminated, the high rigidity of the steering column system can be secured.

As this occurs, referring to FIG. 3(b), there is a fear that distal ends of the gear teeth 17 of the secondary straight-line portion 5B are brought into abutment with distal ends of the gear teeth 819a of the telescoping gear portion 819. In such a case, according to this embodiment, since the telescoping gear portion 819 is held within the accommodating portion 23c in such a manner as to move in the longitudinal direction (the telescoping direction indicated by an arrow T), through elastic deformation of the rubber member RB, the gear teeth 819a of the telescoping gear portion 819 are displaced in the telescoping direction within a limited range relative to the column main body 23, whereby tips of the gear teeth 17, 819a are shifted from each other, thereby making it possible not only to enhance the operation feeling of the operation lever but also to facilitate the meshing of the gear teeth with the simple configuration.

In this embodiment, while the moving loci of the gear teeth 18 and the gear 15 teeth 17 become arc-like ones centered at the clamp bolt 1, the gear teeth 1S, the gear teeth 17, the gear teeth 820a and the gear teeth 819a are formed such that their tooth traces become straight-line for the sake of easy molding. In order for the gear teeth having the straight-line tooth traces to be moved in the arc-like motion, in this embodiment, a tooth depth H and a tooth trace length L of the gear teeth 18 and the gear teeth 820a are made to be 0.8 mm and 7.5 ram, respectively, and when the direction of tooth traces of the gears is formed, on an imaginary plane which would be drawn by a tangent L to a circular arc R which passes through a gear tooth flank about the clamp bolt 1 as a center axis and an axis which is in parallel with an axial direction of the clamp bolt 1 and which passes through the gear tooth flank, on an inclined surface inclined at an angle α from the tangent L, an inclination angle cc of the gear tooth flank=2 degrees, a distance from the clamp bolt 1 to the gear teeth 17 is made to be 30 ram, and a gap G between the confronting gear teeth is made to be 0.6 mm in a direction normal to the axis of the clamp bolt in such a state that the gear teeth mesh with each other. In addition, for the sake of easy molding, the gear teeth 17 and the gear teeth 819a are also formed into the same configuration.

When a least gap G is obtained with the direction of the tooth trace of the gears formed on a tangent to the arc R which passes through the gear tooth flank about the clamp bolt 1 as the center axis, the gap G is expressed by $$G \geq R - \{R^2 - 2 \times (L/2)2\}^{1/2} \qquad \text{Conditional Expression (1)}$$

and in the event that G is 0.473 mm or more, even in the event that gear teeth having straight-line tooth traces are displaced towards each other on arc-like loci, they can mesh with each other.

When gear teeth of which the direction of tooth trace is formed on the inclined surface at the inclination angle α as in the embodiment mesh with each other, since the gap G may be made smaller than the condition expressed in the conditional expression (1), it can be said that the magnitude of the gap G has a sufficient margin. In consideration of the strength of the gears, it is better that the gap G is as small as possible, provided that the aforesaid conditions are satisfied. In addition, the gap G can be made smaller by rounding distal ends of the gear teeth in the tooth trace direction or rounding distal ends of teeth. With a backlash of gears which mesh with each other generally or a gap due to a molding error or the like, the magnitude thereof becomes insufficient, and in the event that gear teeth having a straight-line tooth trance are displaced towards each other on arc-like loci as described above, a meshing failure is produced, and therefore, it is necessary to set the gap G in the way described above.

In contrast to this, when the lever 7 is rotated in a direction indicated by an arrow from the position shown in FIG. 14 in an attempt to perform a column position adjusting operation, since the gear teeth 18 are released from the gear teeth 820a of the tilting gear portion 820 and the gear teeth 17 are released from the gear teeth 819a of the telescoping gear portion 819, the coupled state by the engaging arm 57 is released, whereby the column main body 23 can be displaced relatively to the movable bracket 32. As this occurs, the telescoping gear portion 819 and the tilting gear portion 820 are designed to return to their initial positions by virtue of elastic force of the rubber members RB. By rotating the lever 7 to the position shown in FIG. 1 after the column main body 23 has been shifted to arbitrary telescoping and tilt positions, the fixing of the column main body 23 can be implemented.

Figure 19:
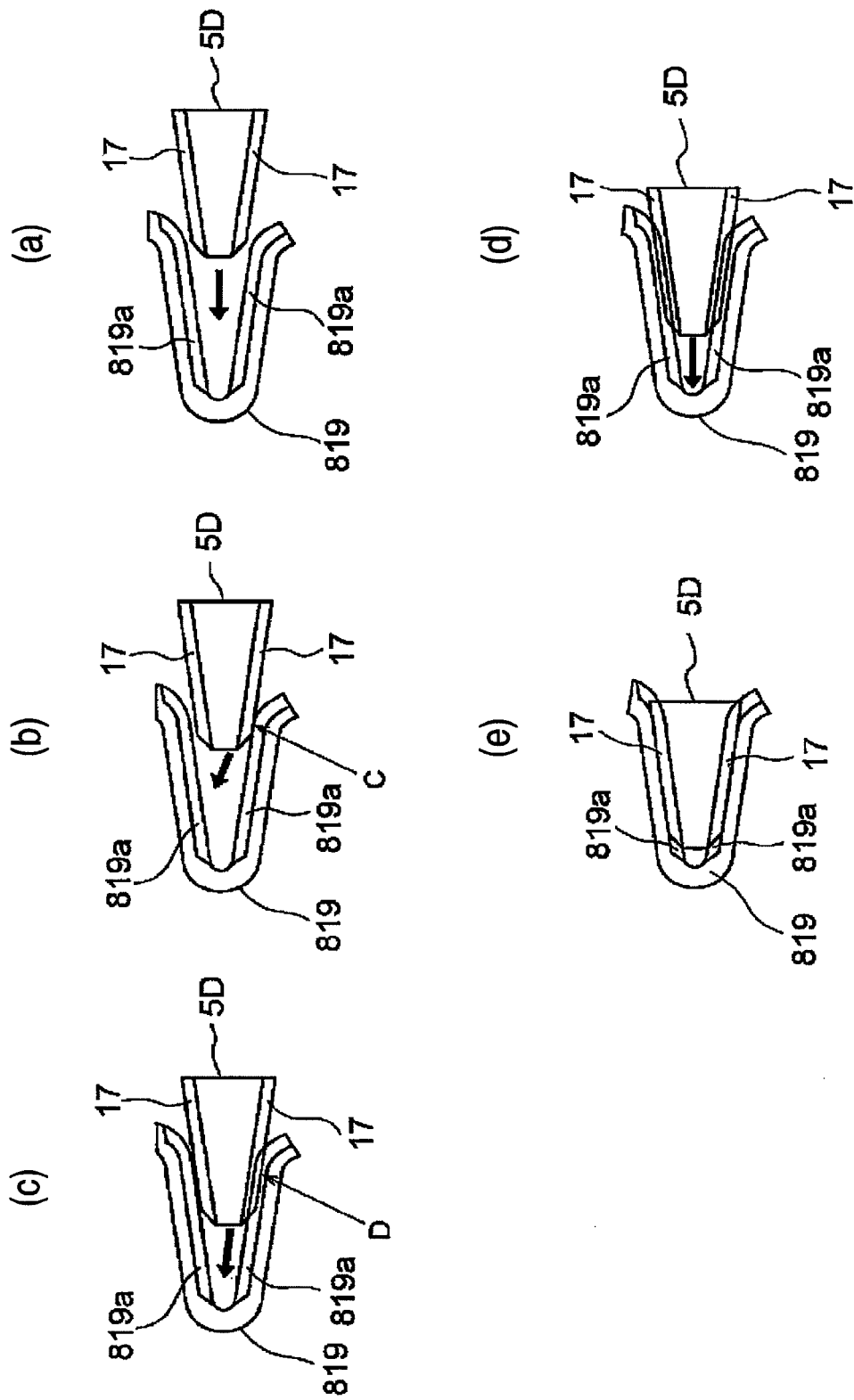
FIG. 19 Sectional views of a gear tooth 17 and a gear tooth 819a of the telescoping gear portion 819 which show from a released state to a meshing state.

FIG. 19 shows sectional views of gear teeth 17 and gear teeth 819a of the telescoping gear portion 819 from a released state to a meshing state. As is shown in FIG. 19, the gear teeth 17, 819a, which are straight teeth, are preferably formed on both of confronting tapered surfaces. Referring to FIG. 19, a meshing operation between the gear teeth 17, 819a will be described. Firstly, in a released state, the gear teeth 819a and the gear teeth 17 which are confronting each other are in such a state that the directions of the tooth traces confront obliquely (at (a) in FIG. 19).

When the operation lever 7 (FIG. 14) is rotated from here so that the gear teeth 17 and the gear teeth 819a are made to move relatively towards each other, in the event that their centers deviate from each other, tips of the gear tooth 819a and the gear tooth 17 on one surface are brought into abutment with each other (a point C at (b) in FIG. 19), however, since the gear teeth are made to approach for meshing along other directions than the normal and tangential directions relative to the respective tooth traces, even after the teeth are brought into abutment with each other at the point C, the engaging arm 57 and the telescoping gear portion 819 can continue to move relative to each other in the direction indicated by an arrow (at (b) in FIG. 19), so that the teeth come into meshing engagement with each other while sliding, whereby the gear tooth 17 can easily mesh with the gear tooth 819a in the midst of sliding (a point D at (c) in FIG. 19).

Where the gear tooth 17 meshes with the gear tooth 819a on the one surface, this acting as a guide, the gear tooth 17 can easily mesh with the gear tooth 819a on the other surface (at (d), (e) in FIG. 19). In this way, in the meshing between the gear teeth 819a, 17 according to the embodiment, compared with a conventional gear meshing, the possibility is low that the tips of the gear teeth are brought into abutment with each other to thereby prevent the movement of the gear teeth, and hence, there is provided an advantage that the operation feeling of the operation lever 7 is enhanced.

In particular, in this embodiment, since the meshing position of the gear teeth 819a, 17 is made to lie in the position which is spaced away from the shaft S and where there is ample space, the periphery of the shaft 5 can be simplified, whereby the steering column system can be simplified and made compact.

Thus, while the meshing operation of the telescoping gear portion 819 and the gear teeth 17, a meshing operation of the tilt gear portion 820 and the gear teeth 18 is basically the same.

Figure 20:
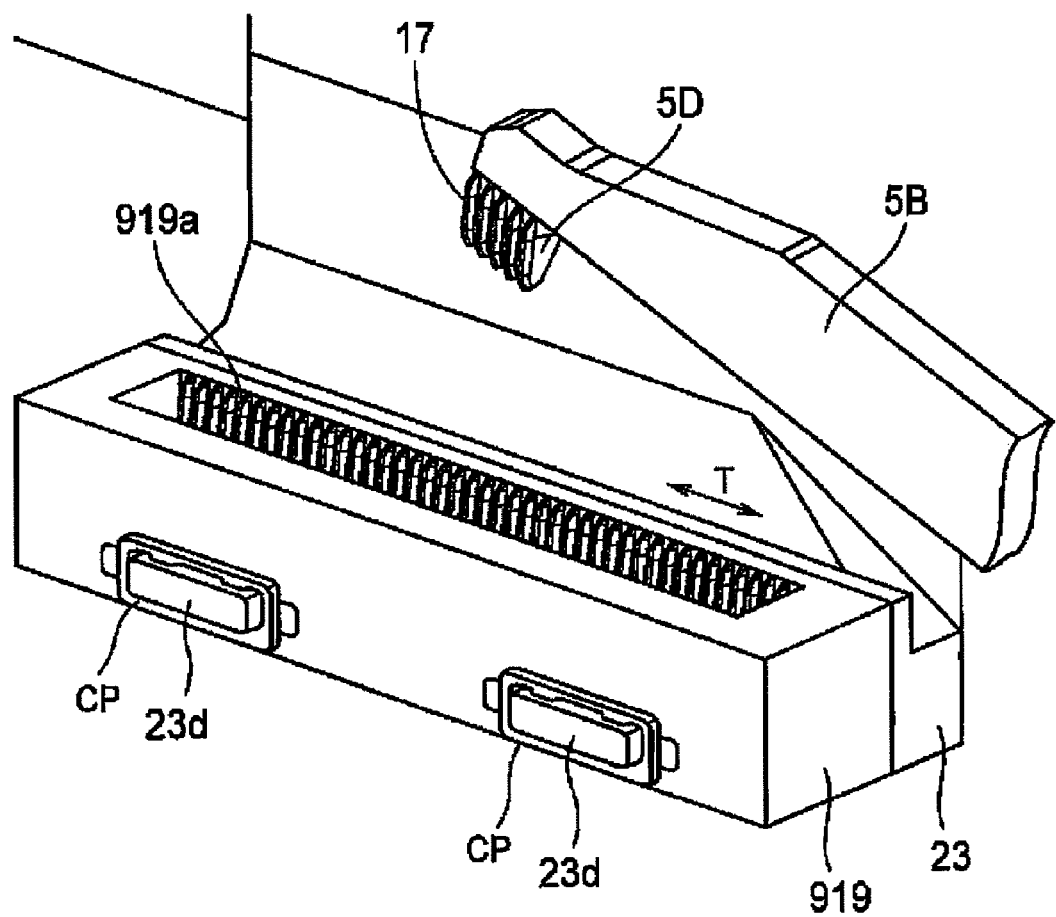
FIG. 20 A perspective view showing the periphery of a telescoping gear portion 919 according to a modified example of the embodiment.
Figure 21:
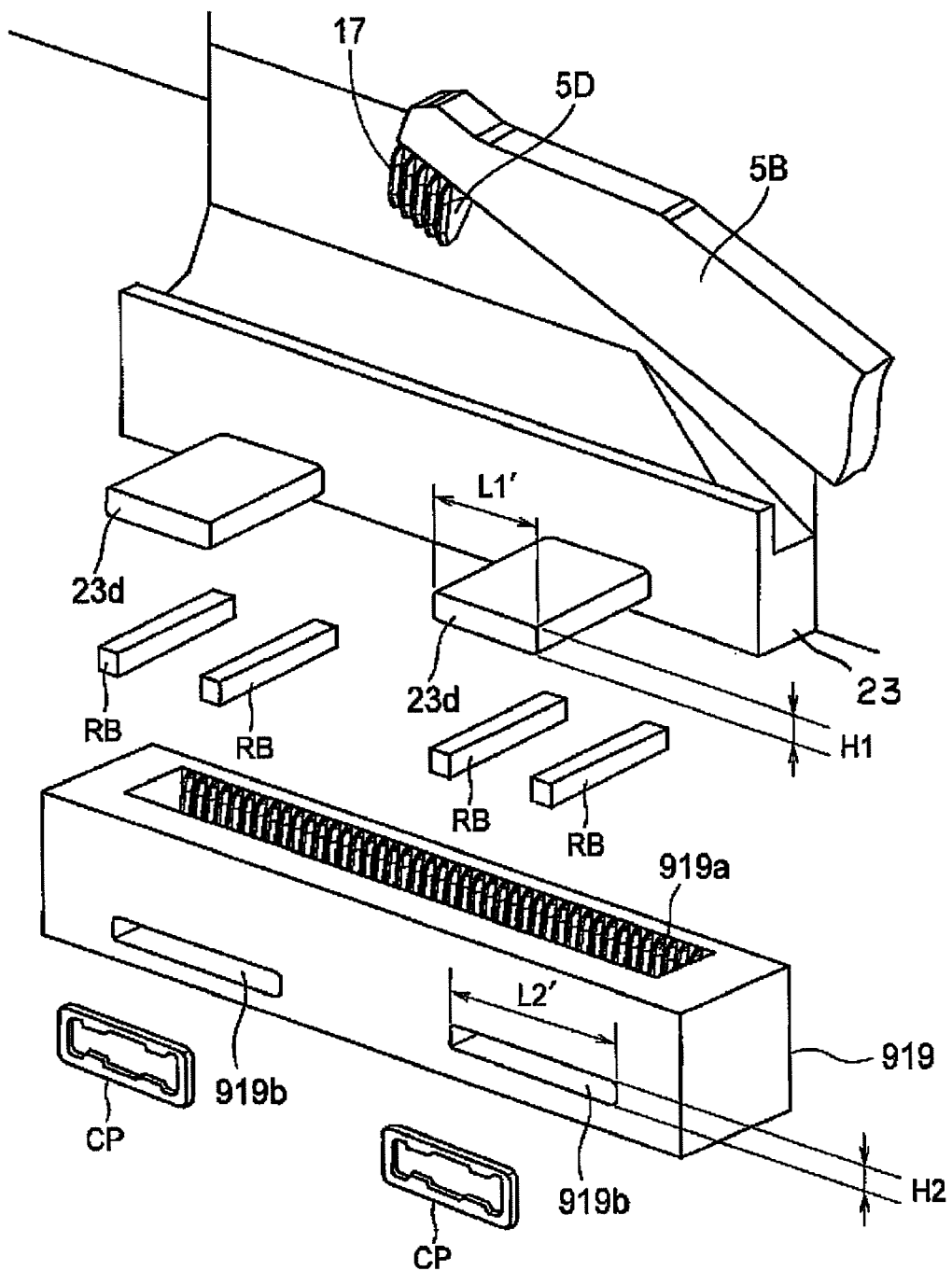
FIG. 21 A perspective view showing the periphery of the telescoping gear 919 according to the modified example of the embodiment.

FIGS. 20, 21 are perspective views showing the periphery of a telescoping gear portion 919 according to a modified example to the embodiment. In this modified example, two plate portions 23d, 23d which have the same shape are formed on the column main body 23 in such a manner as to project sideways so as to extend in the telescoping direction. On the other hand, in the telescoping gear portions 919, two through holes 919b, 919b each having a rectangular cross section are formed in side surfaces thereof. A height H1 and a length L1' of the plate portion 23d are made 10 larger than a height H2 and a length L2' of the through hole 919b in the telescoping gear portion 919, and consequently, the telescoping gear portion 919 is held relative to the plate portions 23d in such a manner as to be displace in the longitudinal direction (that is, the telescoping direction) within a predetermined range without any looseness in a smooth fashion.

In assembling, the respective plate portions 23d are inserted into the through holes 919b of the telescoping gear portion 919, and as the same time, plate-like rubbers RB, RB, which are elastic elements, are disposed between longitudinal ends of the plate portions 23e and the through holes 919b. Furthermore, by bringing fastening tools CP into engagement with grooves or the like which are formed on projecting end portions of the respective plate portions 23d, the prevention of dislocation of the telescoping gear portion 919 can be realized.

According to this modified example, since the telescoping gear portion 919 is held relative to the plate portions 23d, 23d in such a manner as to be displaced in the longitudinal direction (the telescoping direction indicated by arrows) within a limited range, the gear teeth 919a of the telescoping gear portion 919 are displaced in the telescoping direction relative to the column main body 23 by the rubber members RB being elastically deformed, whereby the tips of the gear teeth 17, 919a are made to shift from each other, thereby making it possible not only to enhance the operation feeling of the operation lever but also to facilitate the meshing of the gear teeth.

Figure 22:
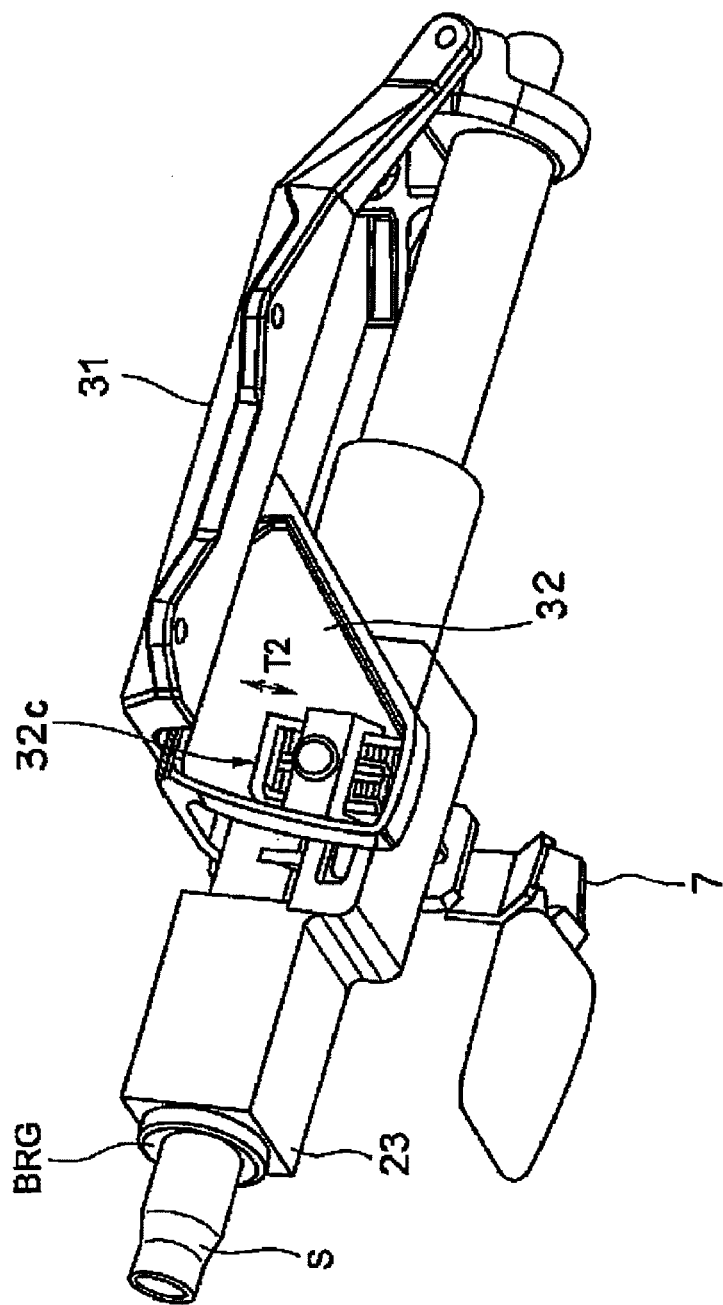
FIG. 22 A perspective view of a steering column system according to another embodiment.
Figure 23:
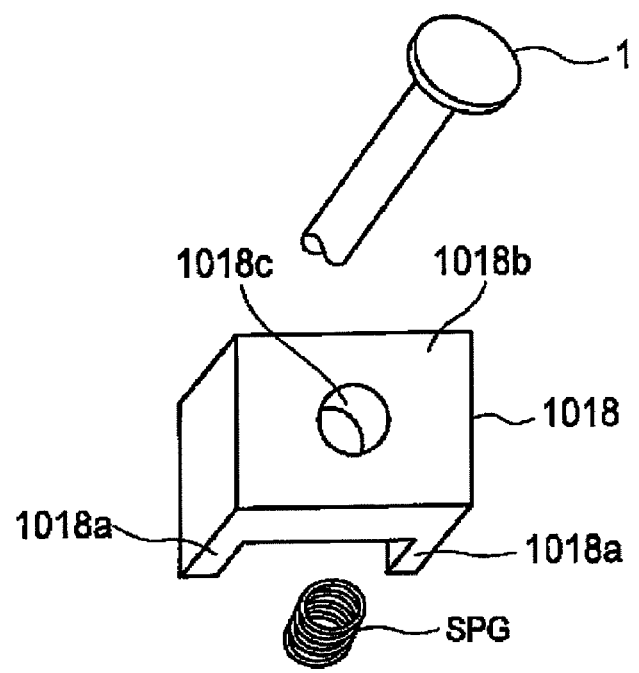
FIG. 23 A diagram showing a state in which the periphery of a tilting gear portion is disassembled.
Figure 24:
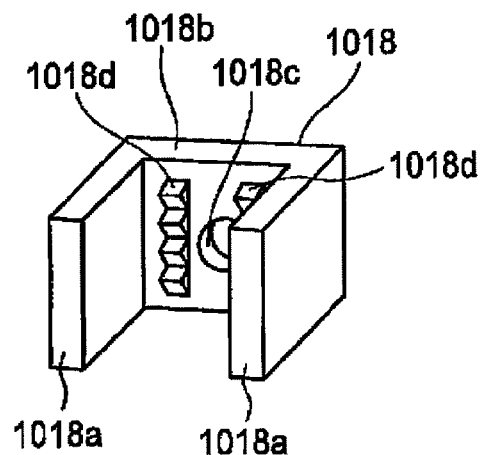
FIG. 24 A perspective view of a drive gear portion as seen in an opposite direction to a direction in which it is seen in FIG. 23.
Figure 25:
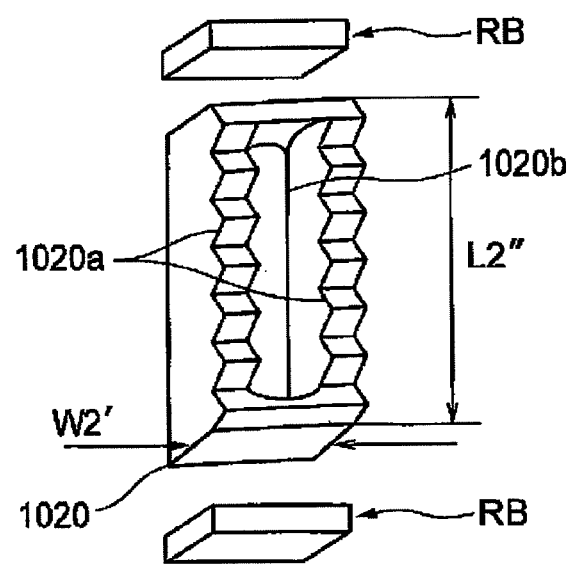
FIG. 25 A diagram showing a state in which the tilting gear portion is disassembled.

FIG. 22 is a perspective view of a steering column system according to an embodiment. FIG. 23 is a diagram showing a state in which the periphery of a tiling gear portion is exploded. FIG. 24 is a perspective view of a driving gear portion as viewed in an opposite direction to the direction in which it is viewed in FIG. 23. FIG. 25 is a diagram showing a state in which the tilting gear portion is exploded. Like reference numerals will be given to like portions to those described in the above embodiments and the description thereof will be omitted.

An accommodating portion 32c having a rectangular parallelepiped space is formed on a movable bracket 32 which fixes a column main body 23 in such a manner as to surround an elongated hole (not shown) which is formed so as to secure a position adjusting width in the tilting direction. A box-shaped tilting gear portion 1020 is accommodated within the accommodating portion 32c. The tilting gear portion 1020 has a central opening 1020b which extends into an elongated hole in such a manner as to secure the position adjusting width in the tilting direction and periodic angular shaped gear teeth (secondary gear teeth) 2020a which are disposed in two rows in such a manner as to be aligned in parallel in the tilting direction on one side thereof.

As is shown in FIG. 23, a width W1' and a length L" of the rectangular parallelepiped space in the accommodating portion 32c are made larger than a width W2' and a length L2" of the tilting gear portion 1020, and consequently, the tilting gear portion 1020 is held within the accommodating portion 32c in such a manner as to be displaced in the longitudinal direction (that is, the tilting direction) within a predetermined range without any looseness in a smooth fashion. Plate-shaped rubbers RB, RB, which are elastic elements, are disposed between the accommodating portion 32c and longitudinal ends of the tilting gear portion 1020.

A driving gear portion 1018 is made up of a pair of side portions 1018a, 1018a and a front portion 1018b which couples together both the side portions. An opening 1018c is formed in the center of the front portion 1018b, and gear teeth (primary teeth) 1018d having a corresponding shape to gear teeth of the tilting gear portion 1020 are formed on a back side of the front portion 1018b. In addition, a coil spring SPG is disposed between the driving gear portion 1018 and the accommodating portion 32c. A clamp bolt 1 is disposed in such a manner as to pass through the opening 1018c in the driving gear portion 1018, the coil spring SPG, the opening 1020b in the tilting gear portion 1020 and an elongated hole (not shown) in the movable bracket 32.

The operation of this embodiment will be described. Since when a lever, not shown, is rotated, an axial tension is exerted on the clamp bolt 1 by a cam mechanism, not shown, the driving gear portion 1018 approaches the tilting gear portion 1020 against the elastic force of the coil spring SPG, whereby the gear teeth 1018d of the driving gear portion 1018 come to mesh with the gear teeth 1020a of the tilting gear portion 1020. By this action, the driving gear portion 1018 is fixed to the movable bracket 32, whereby the positioning of the column main body 23 is enabled.

As this occurs, there is a fear that distal ends of the gear teeth 1018d of the driving gear portion 1018 are brought into abutment with distal ends of the gear teeth 1020a of the tilting gear portion 1020. In such a case, according to this embodiment, since the tilting gear portion 1020 is held within the accommodating portion 32c in such a manner as to be displaced in the longitudinal direction (in a direction indicated by arrows T) within the limited range, the gear teeth 1020a of the tilting gear portion 1020 are displaced in the tilt direction relative to the movable bracket 32 by the rubber member RB being elastically deformed, whereby tips of the gear teeth 1018d, 1020a are made to shift from each other, thereby making it possible not only to enhance the operation feeling of the operation lever but also to facilitate the meshing of the teeth.

In contrast to this, since when the lever, not shown, is rotated in an opposite direction in an attempt to perform a column position adjusting operation, the gear teeth 1018d of the driving gear portion 1018 are released from the gear teeth 1020a of the tilting gear portion 1020, the coupled state by the driving gear portion 1018 is released, the column main body 23 can be displaced relatively to the movable bracket 32. As this occurs, the tilting gear portion 1020 is designed to return to its initial position by virtue of the elastic force of the rubber member RB. The configuration that has been described above can be applied equally to a telescoping adjustment.

Thus, while the invention has been described in detail by reference to the embodiments, the invention should not be construed as being limited to the embodiments, and hence, the invention can, of course, be modified and improved as required to such an extent that the spirit thereof is not damaged. For example, the column main body may be adjustable only in the telescoping direction or the tilting direction relative to the bracket. Furthermore, the material of the elastic elements is not limited to rubber or resin but springs may be used therefor. In addition, in the configuration shown in FIG. 4, for example, an elastic element may be interposed between the circular cylindrical portion 16 of the cam member 22 and the opening 15 which encompasses the circular cylindrical portion 16. In addition, while the circular cylindrical member is provided in the small opening as the receiving portion for the hook portion, the circular cylindrical member may be fitted on the hook portion.

While the invention has been described in detail or by reference to the specific embodiments, it is obvious that the invention can be modified variously without departing from the spirit and scope of the invention.

This patent application is based on Japanese Patent Application (No. 2005-335441) filed on Nov. 21, 2005, Japanese Patent Application (No. 2006-301488) filed on Nov. 7, 2006 and Japanese Patent Application (No. 2006-312432) filed on Nov. 20, 2006, and all the contents thereof are incorporated herein by reference.

The invention claimed is:

1. A steering column system in which a column is fixed relative to a body by a gear meshing function by a steering position adjusting operation lever, wherein the operation lever comprises:
   an engaging arm which includes gear teeth which provide the gear meshing function and
   an adjusting arm on which a position adjusting bolt is assembled and which performs a position adjusting operation, and
   wherein at least the engaging arm is supported in such a manner as to be displaced within a predetermined range relative to the column by passing the position adjusting bolt through an oscillation center hole provided in the engaging arm;
   wherein the engaging arm and the adjusting arm are permitted to perform a predetermined relative movement to each other; and
   wherein an elastic element is disposed between a projection which is provided on one of the engaging arm and the adjusting arm and a receiving portion which is provided on the other.

2. The steering column system as set forth in claim 1, wherein
   an elastic element is disposed between the position adjusting bolt, which is passed through the oscillation center hole provided in the engaging arm, and the oscillation center hole.

3. The steering column system as set forth in claim 2, wherein a recessed portion or a raised portion is formed on at least one of a collar, which is positioned on the position adjusting bolt or between the position adjusting bolt and the oscillation center hole, and the oscillation center hole so that the elastic element is positioned therein or thereon.

4. The steering column system as set forth in claim 1, further comprising a engaging unit which controls a relative rotational amount between the engaging arm and the adjusting arm to a predetermined amount.

5. The steering system as set forth in claim 1, wherein the engaging arm and the adjusting arm are made to rotate together.

6. The steering column system as set forth in claim 1, wherein the gear teeth are formed on both confronting tapered surfaces.

7. The steering column system as set forth in claim 1, wherein when the direction of a tooth trace of the gear is formed on a tangent to a circular arc R which passes through a tooth flank about the position adjusting bolt as a center axis or the direction of a tooth trace of the gear is formed, on an imaginary plane which would be drawn by a tangent L to a circular arc R which passes through a gear tooth flank about the position adjusting bolt as a center axis and an axis which is in parallel with an axial direction of the position adjusting bolt and which passes through the gear tooth flank, on an inclined surface inclined at an angle $\alpha$ from the tangent L, the gear teeth have a space G between tooth flanks of the confronting gears in mesh in an axial direction which passes through the center axis of the position adjusting bolt and which is normal to the tooth traces when the gear teeth mesh with each other, and the space G has a space G which is a least or more space in which the gear teeth having a straight-line tooth trace is displaceable along a locus of the circular arc about the position adjusting bolt for meshing with each other.

\* \* \* \* \*